US008711818B2

(12) United States Patent
Rajappan et al.

(10) Patent No.: US 8,711,818 B2
(45) Date of Patent: Apr. 29, 2014

(54) HIGH PERFORMANCE DATA TRANSPORT SYSTEM AND METHOD

(75) Inventors: Gowri Shankar Rajappan, Somerville, MA (US); Seoung Bum Lee, Arlington, MA (US)

(73) Assignee: Mayflower Communications Company Inc., Burlington, MA (US)

(*) Notice: Subject to any disclaimer, the term of this patent is extended or adjusted under 35 U.S.C. 154(b) by 634 days.

(21) Appl. No.: 12/804,869

(22) Filed: Jul. 30, 2010

(65) Prior Publication Data

US 2012/0026877 A1 Feb. 2, 2012

(51) Int. Cl.
*H04W 4/00* (2009.01)

(52) U.S. Cl.
USPC ........................................................ 370/338

(58) Field of Classification Search
USPC .......................................... 370/503, 389, 338
See application file for complete search history.

(56) References Cited

U.S. PATENT DOCUMENTS

| | | | |
|---|---|---|---|
| 6,052,371 A * | 4/2000 | Lemieux ....................... | 370/338 |
| 6,487,595 B1 | 11/2002 | Turunen et al. | |
| 6,728,365 B1 | 4/2004 | Li et al. | |
| 6,980,523 B1 | 12/2005 | Lipford et al. | |
| 7,151,762 B1 | 12/2006 | Ho et al. | |
| 7,656,879 B2 | 2/2010 | Riedel et al. | |
| 7,684,314 B2 | 3/2010 | Khan et al. | |
| 2003/0099194 A1 | 5/2003 | Lee et al. | |
| 2004/0190527 A1 | 9/2004 | Okura et al. | |
| 2008/0049761 A1 | 2/2008 | Lin et al. | |
| 2009/0109891 A1 | 4/2009 | Fonseca, Jr. et al. | |

OTHER PUBLICATIONS

Yueh-Min Huang; Hua-Yi Lin, "Information service on scalable ad-hoc mobile wireless networks," Computer Networks and Mobile Computing, 2003. ICCNMC 2003. 2003 International Conference on , vol., no., pp. 190, 196, Oct. 20-23, 2003.*
Seoung Bum Lee, et al., "INSIGNIA: An IP-Based Quality of Service Framework for Mobile ad Hoc Networks", Journal of Parallel and Distributed Computing, Apr. 2000, pp. 374-406.
Hemant Chaskar, "Requirements of a Quality of Service (QoS) Solution for Mobile IP" IETF RFC 3583, Sep. 2003, pp. 1-10. All pages.
Lawrence Roberts, "QoS Signaling for IP QoS Support and Sender Authentication", TIA 1039, May 2006, pp. 1-44, All pages.
Stephen Mueller et al., "Multipath Routing in Mobile Ad Hoc Networks: Issues and Challenges", In Performance Tools and Applications to Networked Systems, 2004, pp. 209-234, AI.

* cited by examiner

*Primary Examiner* — Chandrahas Patel
(74) *Attorney, Agent, or Firm* — Kaplesh Kumar

(57) ABSTRACT

System and method for providing data transport Quality of Service (QoS) assurances in homogeneous and heterogeneous communication networks consisting of one or more communication interface types. The system includes Subnet Managers for managing the resources of nodes within the subnets and Flow Managers for managing the communication flows between the nodes. A Real-time Reservation Transport Protocol (RRTP) establishes the resource reservations and QoS transport services for the communication flow payload over the reserved paths. The communication flows are protected against topological variations in the network, such as from node mobility. QoS assurances are also provided to secure communication flows through interoperation with security protocols, such as Internet Protocol Security (IPsec), or encryption devices, such as High Assurance Internet Protocol Encryptor (HAIPE).

55 Claims, 23 Drawing Sheets

Figure 12

| VER | IHL | TOS | Total Length | | |
|---|---|---|---|---|---|
| Identification | | | Flag | Fragment Offset | |
| TTL | Protocol | | Header Checksum | | |
| Source Address (32 bits) | | | | | |
| Destination Address (32 bits) | | | | | |
| Option Type | Option Length | | Reserved | | |
| Service Mode | Delay Bound | | Type of Flow | Preemption Priority | |
| Minimum Rate | | | Maximum Rate | | |
| Timestamp (32 bits) | | | | | |
| Source Port | | | Destination Port | | |
| Length | | | Checksum | | |

IPv4 Header

RTTP Header (IP Option) 1220

UDP Header 1240

Figure 14

| VER | IHL | TOS | Total Length | | |
|---|---|---|---|---|---|
| Identification | | | Flag | Fragment Offset | |
| TTL | | Protocol | Header Checksum | | |
| Source Address (32 bits) | | | | | |
| Destination Address (32 bits) | | | | | |
| Option Type | | Option Length | Reserved | | |
| Service Mode | | Delay Bound | Type of Flow | | Preemption Priority |
| Minimum Rate | | | Maximum Rate | | |
| Time Stamp (32 bits) | | | | | |
| Source Port | | | Destination Port | | |
| Sequence Number | | | | | |
| Acknowledgment Number | | | | | |
| Offset | Reserved | Control bits | Window Size | | |
| Checksum | | | Urgent Pointer | | |

IPv4 Header

RRTP Header  1420
(IP Option)

TCP Header  1440

HIGH PERFORMANCE DATA TRANSPORT SYSTEM AND METHOD

This invention was made with U.S. Government support under Contract FA8750-08-C-0047 awarded by the U.S. Air Force. The U.S. Government has certain rights to this invention.

TECHNICAL FIELD

The invention generally relates to packet switched digital communication networks, and in particular the provision of quality of service (QoS) for the communication traffic flows in packet switched networks that include wireless links and mobile nodes.

BACKGROUND

Communication networks can be generally classified into circuit switched networks and packet switched networks. In circuit switched networks, such as telephone networks, when a voice call is set up between two users, the end-to-end communication channel is allocated in a dedicated manner to that voice call. This dedicated availability of communication channel results in a voice call that performs well in terms of relevant quantitative metrics such as intelligibility, delay, and jitter. As a result, the human participants in the voice call perceive the conversation to be qualitatively good and close to an in-person conversation.

In contrast, packet switched networks, such as Internet Protocol (IP) networks, share the available bandwidth between numerous simultaneous traffic flows. A voice call placed over such a network in the form of, say, a Voice over IP (VoIP) call, shares network resources with other concurrent traffic flows. Consequently, the quality of the voice call may vary with the ebb and flow of the concurrent traffic flows that compete for resources. For instance, voice packets may be dropped by a router that is performing at its capacity; or they may incur long delays when they transit through a congested portion of the network; or delays in subsequent voice packets may vary due to the variations in the availability of network resources. There is a need for methods and systems in packet switched networks to ensure that network traffic, such as a VoIP call, is reliably transported over the network.

The concept of Quality of Service (QoS) describes reliable transport of traffic over packet switched networks. Broadly speaking, QoS involves promising and meeting relevant performance metrics for different traffic types. For instance, in the case of voice traffic, QoS may include an upper bound on the latency. Different QoS systems may offer different levels of assurances in meeting this latency upper bound. For instance, a QoS system may only offer its "best effort" under prevailing circumstances, and a different system may group all such voice traffic together and attempt to provision network resources for the voice traffic as a group. Furthermore, different QoS systems may be applicable to different types of networks. Some may only be applicable to packet switched networks that consist of wired links, such as Ethernet and Fiber Optics based Local Area Networks (LAN) or Wide Area Networks (WAN).

A number of systems and methods have been proposed to provide QoS in packet switched networks. These QoS systems are broadly classified into Best Effort, Differentiated Services (DiffServ), and Integrated Services (IntServ) systems.

Best Effort service is one in which no guarantees or promises are provided that a traffic flow will be transported within certain performance metrics, or even that a packet within that traffic flow will be delivered to the destination. The system merely promises best effort under the prevailing circumstances. In DiffServ systems, traffic flows are grouped together into disparate classes, which may be differentiated in their characteristics. For instance, VoIP traffic and video streaming traffic may be assigned to two different classes. DiffServ QoS systems strive to provide network resources across an entire class. Individual flows within a class may not achieve the necessary performance metrics, but the performance metrics are achieved when averaged over the concurrent flows that belong to the same class. In IntServ systems, individual traffic flows are provided for separately from all other traffic flows. For example, the QoS of each VoIP flow is managed and provided for separately. Though this is a promising approach in terms of meeting the specified performance metric for each individual flow, this approach inherently does not scale up to the large number of concurrent traffic flows that occur in a communication network.

Systems and methods have also been proposed to provide QoS for particular packet switched networks. For instance, the Internet Engineering Task Force (IETF) Request for Comments (RFC) 2475, titled "An Architecture for Differentiated Services," describes a system for providing DiffServ QoS in the Internet. Also, IETF RFC 2205 describes the Resource ReSerVation Protocol (RSVP), which is intended to establish reservations per traffic flow in the Internet and by doing so, provide IntServ QoS in the Internet. Further examples include QoS system and method standards for LAN and WAN networks, such as the Institute of Electrical and Electronics Engineers (IEEE) standards IEEE 802.1p, IEEE 802.1Q and IEEE 802.11e.

These prior art QoS systems and methods have dealt with predominantly wired networks, such as the Internet. Even the work proposed for QoS in wireless communication has largely focused on end-to-end QoS in cellular networks where only the "last hop," i.e., between the base station and the cellular subscriber, is wireless. For instance, U.S. Pat. No. 6,728,365 B1 extends RSVP signaling to wireless networks for supporting end-to-end QoS in Code Division Multiple Access (CDMA) cellular networks such as CDMA 2000. And, U.S. Pat. No. 6,980,523 B1, in disclosing a system and method for the 3G packet data network, utilizes RSVP to provide end-to-end QoS in a network that is coupled to a wireless mobile station. These QoS systems are applicable to networks that consist predominantly of wired links, with only the link between the base station and cellular subscriber being wireless.

QoS systems have also been proposed for Wireless Local Area Network (WLAN) systems, such as those specified by the IEEE 802.11 standards. For instance, U.S. Pat. No. 7,151, 762 B1 introduces virtual streams to support QoS sessions in WLAN. And, US Patent Application Publication No. 2008/0049761 A1 discloses an in-band signaling reference model to support QoS sessions in WLAN. These QoS systems are applicable primarily to WLANs, and do not support networks that are designed with multiple, disparate wireless interfaces.

Communication networks are trending towards convergence, in the sense that users of disparate networks such as the Internet, cellular networks, IEEE 802.11 standards-based WLAN networks, and emerging networks such as Vehicular Area Networks (VANs) can communicate seamlessly with each other. For instance, the user of a VAN should be able to conduct a video conference with one who is connected to the Internet at home, without the quality of the user experience being adversely affected by the mobility of the nodes in the VAN or the differences between the communication capacities of the VAN nodes and the Internet nodes. There is need for a versatile and comprehensive QoS system that can provide the QoS assurances required in such heterogeneous communication scenarios.

The heterogeneous networks can also consist of segments, conventionally described as Mobile Ad Hoc Networks (MANETs), in which the nodes are mobile, wireless, and connected in an ad hoc manner. Providing QoS assurances within such MANET segments as well as when operating in conjunction with other networks, such as cellular networks, is challenging. INSIGNIA, developed by one of the inventors herein, is the first QoS signaling protocol designed to support adaptive QoS guarantees for real-time traffic in MANETs, and is representative of the state of the art in QoS frameworks for mobile MANETs. "*INSIGNIA: An IP-Based Quality of Service Framework for Mobile Ad Hoc Networks*", S. B. Lee et al, Journal of Parallel and Distributed Computing, Vol. 60 No. 4 pp. 374-406, April 2000 (Special issue on Wireless and Mobile Computing and Communications). INSIGNIA assumes a flat network in which there is no hierarchy between the nodes. It adopts in-band signaling to piggyback the control information on the IP header of the traffic so that the required node resource reservation and QoS treatment can be provided along the flow, without the need of a pre-established flow path. At each hop, the INSIGNIA packet reserves the bandwidth required to meet the QoS request. INSIGNIA supports fast reservation, fast restoration and responsive adaptation that are specifically designed to deliver adaptive real-time service in MANET.

INSIGNIA, however, is limited in several ways. It is suited to a homogeneous network in which all the nodes have the same interface type. It lacks scalability because all the participating nodes are required to create and maintain resource reservations. As the number of flows in the network increases, some of the INSIGNIA nodes can fail to timely manage the reservations because of the corresponding exponential increases in their number. Also, whenever the network needs to reroute the traffic, requiring topology changes, all the impacted nodes (nodes along the old paths and nodes along the new paths) have to update their reservations. In a highly dynamic network, therefore, the reservations in an INSIGNIA system remain valid for only a short duration, which places a considerable processing burden on the network. INSIGNIA is also only able to support QoS data traffic in the reserved service mode and best effort service mode. There exists a need for a scalable QoS system that has the ability to perform efficient and reliable mobility management over ad hoc connections in order to provide the QoS assurances in heterogeneous communication scenarios that include MANETs.

Communication flows in Internet Protocol (IP)-based networks, such as the Internet and IP-based MANET, may be secured by security protocols, such as Internet Protocol Security ("IPsec"), and security devices, such as the High Assurance Internet Protocol Encryptor ("HAIPE"). Such protocols and devices complicate the provision of QoS assurances because they encrypt the IP datagram to provide the protection. This in turn also encrypts the QoS information described in the IP datagram. In order to provide QoS assurances for secure communication flows protected by such protocols and devices, there is also a need for a QoS system that has the ability to provide QoS assurances in networks to communication flows protected by security protocols such as IPsec and security devices such as HAIPE.

SUMMARY OF THE INVENTION

While the prior art QoS systems and methods have dealt with predominantly wired networks, such as the Internet, the invention herein focuses on providing QoS in networks having predominantly wireless links and mobile nodes. The QoS assurances are provided in homogeneous communication networks having a single network interface type as well as heterogeneous communication networks that include multiple network interface types. QoS assurances are provided in such networks even when they use security protocols, such as IPsec, and security devices, such as HAIPE.

A high performance data transport system and method for providing assured Quality of Service (QoS) in data networks is disclosed and claimed. The technology consists of networking protocols, and more specifically a new Real-time Reservation Transport Protocol (RRTP). RRTP is a versatile protocol that performs resource reservations for guaranteed QoS, and provides transport for the guaranteed QoS traffic payload over the reserved routes. This dual functionality provides two benefits: (1) the reservations can be made and modified via in-band signaling, and, therefore, with reduced overhead, and (2) the RRTP presents a unified interface to applications and routing for both signaling and media traffic, and, therefore, facilitates ease of integration with existing data communication networks.

Even as it builds upon some of the features of INSIGNIA, such as in-band signaling, soft-state management, and QoS adaptation, RRTP overcomes its drawbacks. It resolves the scalability problem by aggregating reservations within a subnetwork, i.e. a subnet. A Subnet Manager node aggregates the reservations within its aggregation zone (i.e., subnet) and manages the resources of all nodes within such subnet. (Subnet managers are more capable mobile nodes). Since the resources are reserved at the subnet level, reallocation of resources due to topology changes related to node mobility within the subnet is handled locally and is transparent to the resource management with RRTP. The reservations in a RRTP system remain valid for significantly longer duration/ time than with INSIGNIA, even in a highly dynamic network. RRTP is applicable to both homogeneous and heterogeneous networks, and offers a wider spectrum of practical service modes for various applications, namely Guaranteed Rate service, Available Rate service, Variable Rate service, and Best Effort service. It copes better with high speed node mobility through the making of resource reservations at nodes lying along multiple paths to the destination node. These multiple paths, corresponding to the branches of a multipath tree, include the active data transport path and paths created alongside it. When high speed node mobility requires rerouting of the traffic flow to an alternate path, the pre-existing virtual reservations along the new alternate path are dynamically switched to active reservation status and data transport continued along such alternate path.

The existing communication networks typically offer multiple optional data transmission paths, characterized by different radios and combinations of radios, between a source node transmitting the data and a destination node receiving it. Resource reservation entails reserving the required network data management resources along the selected path(s) having the appropriate combination of radios for supporting the required QoS. Once the resources are reserved, their management presents a continuing challenge, particularly in the face of topology changes. Frequent topology changes, such as from node mobility, require increased signaling to maintain the desired QoS level.

The invention herein overcomes these challenges by differentiating the network nodes into three types: relay nodes for providing the guaranteed reservations; Subnet Manager nodes for managing the QoS-related networking resources at the sub-network level; and Flow Manager nodes for managing the data transport function and downstream link variability.

The relay nodes are network-capable nodes lacking any special functionality. Relay nodes comprising the start and end points of a RRTP connection are designated respectively as the Source and Destination nodes. Relay nodes, for example, can include such varied networking capable wireless devices as WiFi phones, I-Phones, Smart Phones, notebooks with WiFi/Bluetooth, and smart PDAs with wireless network capability. Examples of Flow Manager nodes include high powered communication devices that maintain connectivity to other Flow Manager nodes in the network, an example of which is a portable access point that can be deployed in an ad hoc manner and connected to neighboring Flow Manager nodes either directly or via intermediate relay nodes. Similarly, the Subnet Manager node can be another high powered networking capable node that manages the resources (i.e., determines who has the access rights, who can use the radio communication links, at what rate, at which priority etc.) of the nodes within its subnet. In many cases, the Subnet Manager node and the Flow Manager node can be the same node. Other examples of such nodes would be obvious to those of ordinary skill in the art and are within the scope of the invention herein. The foregoing examples have been presented only by way of information and not by way of any limitation of the invention, which is to be limited only by the claims herein.

The Subnet Manager node manages RRTP in an aggregation zone that is a subset of the network, i.e. a sub-network or subnet. The span of the subnet is determined by the Flow Manager but the networking resources of the nodes within the subnet and their reservations are managed by the Subnet Manager. Even though the RRTP reservation flow message from the source node to the destination node does not have to transit through the intervening Subnet Managers, resource reservations along the data transport path must be requested from such Subnet Managers. The management by the Subnet Manager node of the resources of the nodes in its local aggregation zone significantly improves the scalability of resource management.

The Subnet Manager node provides an effective means of resource reservation and management in the face of heterogeneity. It maintains as reservations the resources of each of the nodes in its subnet, and acts as the guarantor of reservations made within its subnet. The unused resources that are protected as reservations are available for best effort data traffic, but can be pre-empted when the reservation is activated for the use of QoS traffic. Thus, the Subnet Manager node can instantaneously issue a reservation or change the parameters of an existing reservation on demand. Within the subnet, only the Subnet Manager keeps track of the individual flows.

The Flow Manager is essentially a stable node, i.e. one that is static or of low mobility, having excellent connectivity and located near the source node, so that it is able to form multiple paths from the source node to the destination node in cooperation with any other intervening Flow Managers along the data transport path. This allows the Flow Manager to overcome the effects of high speed node mobility by switching the data traffic over to an alternate path as the current one deteriorates.

The Flow Manager node provides the ability to overcome the effects of topology dynamics and link variations without losing the reservation. Based on projected node mobility scenarios, the Flow Manager node forms a multiple path tree rooted at itself and extending to the destination node (i.e. the receiver of data), and creates reservations along such tree's multiple paths. These reserved resources are available for best effort traffic, but can be pre-empted when a reservation is activated for the use of guaranteed QoS traffic. Only one branch of the multipath tree is activated at a given time for data transport, and, as the mobility scenario evolves, this active branch can be changed dynamically, as required, to an alternate path of the multipath tree.

Accordingly, an object of the instant invention is to provide a system and method for wireless packet switched digital communication networks that ensure reliable transport of network traffic such as VoIP calls.

A second object of the instant invention is to provide a data transport system and method for wireless packet switched digital communication networks that can provide the QoS assurances required in homogenous communication networks having a single interface type and heterogeneous communication networks having multiple interface types.

A third object of the instant invention is to provide a data transport system and method that can perform mobility management over ad hoc connections in wireless packet switched digital communication networks in order to provide QoS assurances in communication scenarios that include MANETs.

Another object of the instant invention is to provide a data transport system and method that can provide QoS assurances in wireless packet switched digital communication networks to communication flows protected by security protocols, such as IPsec, and security devices, such as HAIPE.

Still another object of the instant invention is to provide a data transport system and method that can provide QoS assurances in wireless packet switched digital communication networks where the networking resources of the nodes within a subset of the network, i.e. a sub-network or subnet, are managed and controlled by a single entity, the Subnet Manager.

Yet another object of the instant invention is to provide a data transport system and method with the ability to provide QoS assurances in wireless packet switched digital communication networks employing a Real-time Reservation Transport Protocol (RRTP) for dynamically reserving the resources of nodes required for data transport and Subnet Managers and Flow Managers for managing QoS for these RRTP traffic flows.

These and other objects of the present invention are achieved in the preferred embodiment of the high rate data transport system described using the accompanying drawings. The drawings, however, are primarily for illustration and must not be construed as limiting. The scope of the invention is to be limited only by the claims, and not by the drawings or description herein.

BRIEF DESCRIPTION OF THE DRAWINGS

The objects, features, and advantages of the present invention are more fully understood when considered in conjunction with the following accompanying drawings:

FIG. 12 depicts an IPv4 datagram with RRTP header with UDP as its payload;

FIG. 14 depicts an IPv4 packet with RRTP header with TCP as its payload;

DETAILED DESCRIPTION OF THE INVENTION

Figure 1:
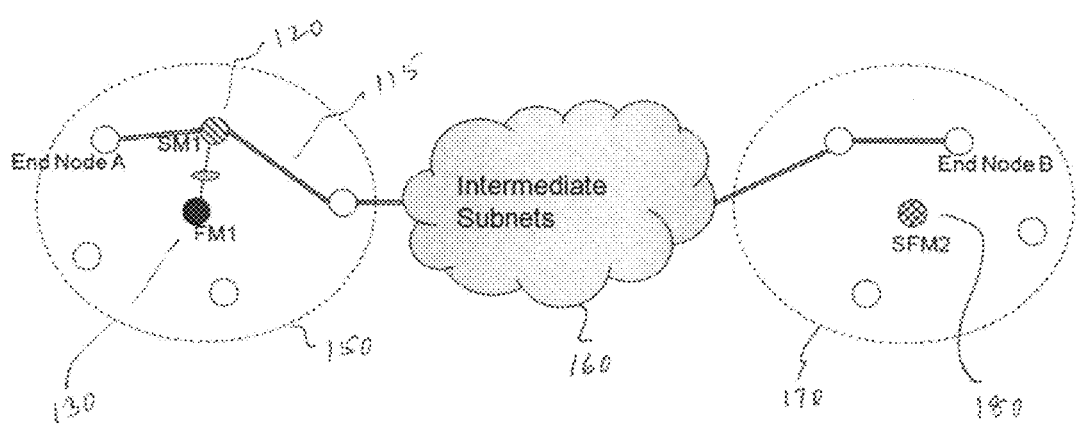
FIG. 1 is an illustration of the Quality of Service (QoS) assurance system and method of the current invention, consisting of Real-time Reservation Transport Protocol (RRTP), Subnet Managers, and Flow Managers.

The invention herein employs a new data transport protocol, Real-time Reservation Transport Protocol (RRTP), to carry end-to-end traffic flow for which QoS is to be managed, and Subnet Managers and Flow Managers to manage QoS for the RRTP traffic flows. FIG. 1 shows the preferred embodiment of this invention. As shown in FIG. 1, the traffic flow between End Node A (the Source Node) in subnet 150 and End Node B (the Destination Node) in subnet 170, for which QoS assurance is desired, is transported via intermediate subnets 160 using RRTP 115.

The Subnet Manager nodes present in the network, e.g. SM1 120, maintain and manage the resources of all nodes in their subnets as reservations. These reserved resources can be allocated for the RRTP flow 115. The Flow Managers in the network, e.g. FM1 130, are responsible for managing the traffic flow and ensuring that QoS assurances on the flow are met for the duration of such traffic flow, even in the presence of phenomena such as link variability and node mobility, which might otherwise adversely affect the QoS.

Figure 2:
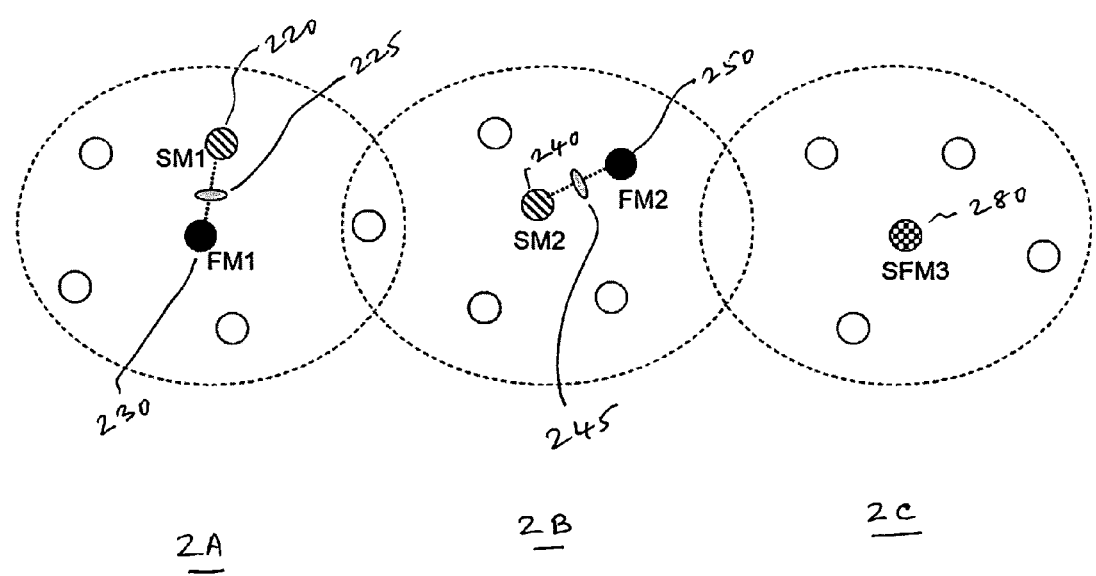
FIG. 2 is an illustration of a network organized into multiple subnets, with Subnet Manager and Flow Manager functionalities provided in each subnet.

The communication network employing the invention herein will have at least one Subnet Manager and at least one Flow Manager. The Subnet Manager and Flow Manager can be separate nodes, e.g. 120 and 130, or even the same node, e.g SFM2 180. FIG. 2 shows a network consisting of three subnets 2A, 2B, and 2C, the first two of which each have a Subnet Manager, 220, 240, and a Flow Manager, 230, 250. The 2C subnet has a node that is both a Subnet Manager and a Flow Manager, SFM3 280.

Although the Subnet Manager is the node that manages resources in a subnet, the subnet itself is defined by the Flow Manager. As an example, each Flow Manager could be responsible for a region of two-hop diameter. This two-hop diameter region comprises the subnet whose resources are monitored and managed by its Subnet Manager. (A hop represents the data transfer path between two nodes in direct communication with each other.) The nodes are two hops away from each other where data transfer between them occurs via an intervening node in direct communication with each of them. A region of 2-hop radius centered upon the node of interest consists of all network nodes that are within two hops of such node of interest. Since the span of the subnet is determined by the Flow Manager but the resources and reservations within the subnet are managed by the Subnet Manager, there exists a tight coupling relationship, 225, 245, between them.

Figure 3:
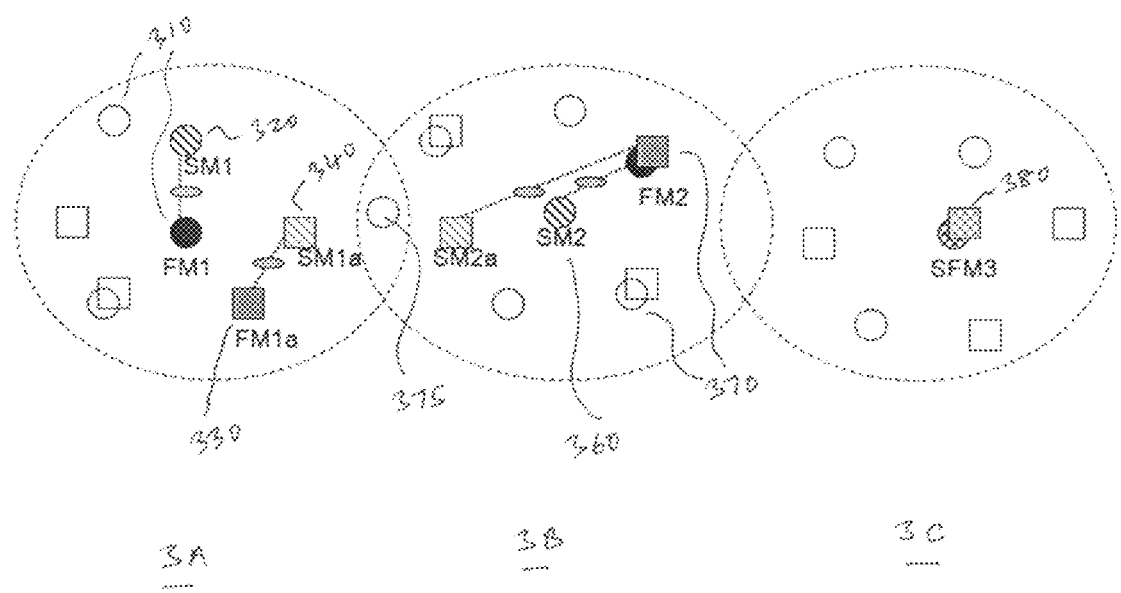
FIG. 3 is an illustration of a multi-interface network organized into multiple subnets, with Subnet Manager and Flow Manager functionalities available for each interface in each subnet.

If the network consists of multiple network interface types that communicate with each other via gateway nodes, there is one or more Subnet Manager node and one or more Flow Manager node for each of the network interface types. FIG. 3 shows a network consisting of three subnets, 3A, 3B, 3C, and two network interface types. Nodes with the first type of network interface are denoted by circles, e.g. 310, 320, and nodes with the second type are denoted by squares, e.g. 330, 340. Nodes that are provided with both interface types, e.g. 370, are denoted by squares and circles superimposed upon each other. Such latter nodes, e.g. 370, can act as gateways by serving as conduits between the two network interface types. As shown in FIG. 3, in each subnet at least one Subnet Manager and at least one Flow Manager are present for each network interface type.

Each Subnet Manager node, e.g. 320, is responsible for managing the resources of nodes having its interface type within the subnet. Subnet Managers corresponding to different network interface types, e.g. 340, are responsible for respectively managing the resources of the different corresponding network interface types within the subnet. The key role of a Subnet Manager is to maintain and manage the resources of the nodes in its subnet in the form of actual and virtual reservations. Actual reservations correspond to resources that are committed to QoS assurances of ongoing RRTP flows, while the virtual reservations correspond to those resources (of the nodes along the multipath tree, as described below) that are reserved for possible future use. Virtual reservations are typically secured at neighboring subnets along the path selected and activated for RRTP traffic flow.

The virtual reservations are available for best effort traffic, but can be pre-empted when the reservation is activated for the use of traffic requiring QoS assurance. The Subnet Manager, 320, can instantly issue a new reservation or change the parameters of an existing reservation. The virtual reservations are created over several potential paths between the source and destination, e.g. End Node A and End Node B in FIG. 1, one of which is selected and activated for data transport at any given time, and where such selected active path can be changed dynamically by the respective Flow Manager(s) if required, such as, for instance, due to topological changes from node mobility. All Subnet Manager nodes managing the nodes on the multiple potential paths are involved in the management of the virtual reservations. The virtual reservations in each subnet are committed by its local Subnet Manager, e.g. SM1 320.

Figure 4:
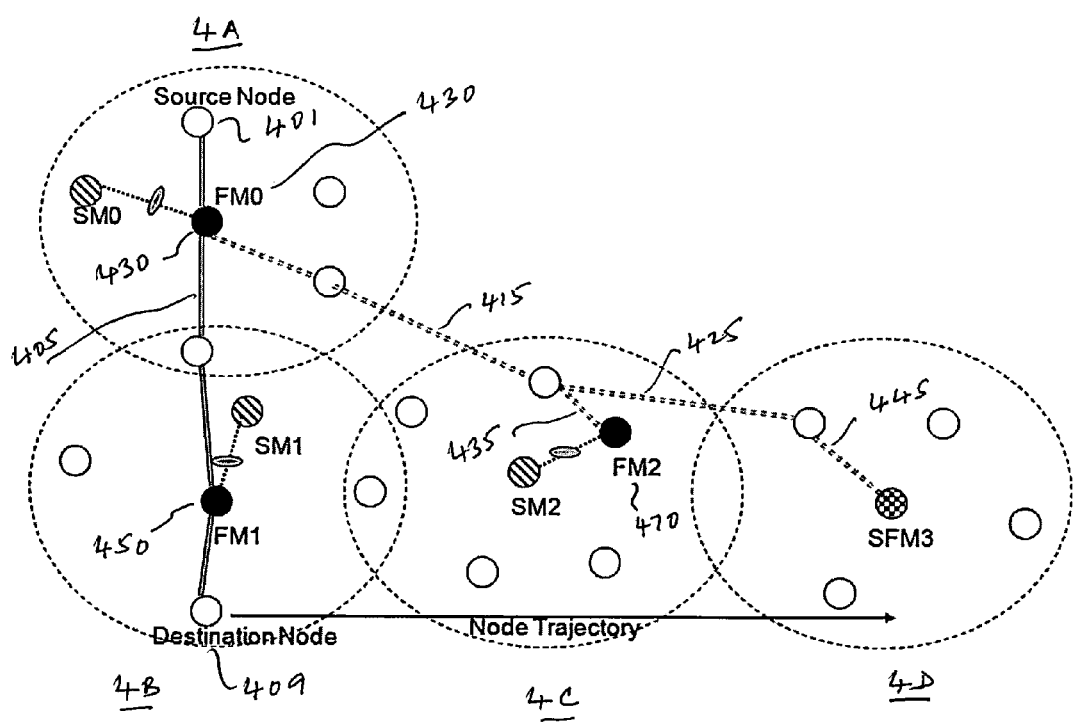
FIG. 4 is an illustration of a QoS assured traffic flow set up such that the QoS assurance can be maintained even when there is node mobility.

Maintaining QoS assurances in the presence of node mobility and, consequently, topology change, is daunting. Though the network topology may change, the delivered QoS must not, and therefore new resources need to be marshaled, as necessary. For this, the Flow Manager node 430 forms a multipath tree from the source node 401 towards the destination node 409. (FIG. 4.) The multipath is composed of an active data transport path 405 and virtual data transport paths, 415, 425, 435, 445 with which the virtual reservations are associated. The resources spoken for by the reservations are available for best effort traffic, but can be pre-empted when the reservation is activated for the use of the RRTP traffic. The multipath tree is rooted at the Flow Manager node, e.g. 430, within whose subnet the source node 401 resides. Only one branch, i.e. path, of this multipath tree is activated at a time, 405. Depending on how the mobility scenario evolves, data transport from this currently active branch can be switched dynamically to an alternate path, e.g. 415 and 435, that is activated.

In order to execute this functionality of managing traffic flows in the presence of mobility, the Flow Manager node, 430, utilizes information such as the state of the communication links (e.g. obtained from link-state routing protocols that are used by network nodes to compute routes to other nodes in the network), location information (e.g. GPS coordinates obtained using GPS devices incorporated within the network nodes), and mobility patterns of relevant nodes (such as those obtained from pre-existing logistical or mission planning charts) when such information is available. Otherwise, it makes flow management decisions based on the partial information available.

When limited information is available, the Flow Manager maintains its multipath tree options by covering a certain number of hops about the active path from the source node to the destination node, so that if the currently active path becomes invalid due to mobility of the source node, destination node, or an intermediate node, the Flow Manager is able to utilize one of the alternate standby paths and divert the traffic to it. Where the source node moves beyond the coverage area of the instant Flow Manager, its association with the mobile source node is handed over to the Flow Manager of the adjoining subnet into which such node has moved, and this adjoining subnet Flow Manager then assumes responsibility for the establishment and maintenance of the multipath tree for the source node.

Since the key responsibility of the Flow Manager, e.g. 430, is establishing and managing the paths of the multipath tree to counter the effects of mobility, it needs information from link state routing protocols, examples of which include OSPF, IS-IS, and OLSR. The link state routing information may or may not include QoS metrics such as available bandwidth, delay measurements, and buffer occupancy. Based on the link-state routing information, the Flow Manager node, 430, establishes virtual reservations on the multipath tree. This requires signaling exchanges between the local Flow Manager 430, associated with the source node 401, and multiple foreign Flow Manager nodes, e.g. 450, 470, on the multipath tree. The local and foreign Flow Manager nodes on the multipath tree interact with their respectively coupled Subnet Manager nodes to secure the reservations. Also, to maximize the efficiency and effectiveness of the virtual reservations of the multipath tree, the Flow Managers utilize location information and projected mobility paths of the mobile nodes, as available. With link-state routing information, timely location information, and mobility trajectory information, the Flow Managers can more effectively request and help secure virtual reservations on the multipath tree, which is continually adapted to accommodate any topological changes due to node mobility or failure of the instant Flow Manager node.

The Flow Manager nodes perform signaling to create, refresh, and remove reservations on the multiple paths. The virtual reservations are essentially soft-reservations that require periodic refresh. Any virtual reservation that has not been refreshed beyond a predetermined time interval is removed. Based on the node mobility pattern information, a Flow Manager node can also expressly request a Subnet Manager to remove the virtual reservations without relying on soft-state timeouts. The multipath is most effective if the mobility pattern of the mobile nodes is known in advance, but even with an unknown mobility pattern the virtual reservations can be created in the vicinity of the current active data transport path.

In other words, when the mobility pattern of the nodes is unknown, virtual reservations are created in the aggregation zones adjacent to the current active data flow path. For example, the Flow Manager and Subnet Manager can create and manage virtual reservations on nodes within a two-hop vicinity of the current path. Such an approach is less efficient, but nonetheless effective. Lack of mobility information or location information results in creating redundant virtual reservations spanning a wider area and requiring more signaling messages for their management.

A source node wishing to establish a RRTP flow has to first associate itself with its local Flow Manager node. The association process proceeds as follows:

The Flow Manager nodes periodically notify their neighboring nodes of their presence, for example, via broadcast messages with limited Time to Live, TTL (also identified as the hop limit in IPv6), where the TTL value determines the size of the Flow Manager's region, i.e. the size of the subnet.

Based on these notifications, the node wishing to transmit data binds itself to the appropriate Flow Manager node.

Where a new node lacks a Flow Manager association, the new node performs a ring-search to identify the nearest Flow Manager node(s) in its vicinity. The ring-search first executes a 1-hop broadcast and searches its adjacent neighbors. If no Flow Manager node is found, the ring-search extends its search depth to 2-hops.

Based on the ring-search response(s), the new (source) node chooses the best Flow Manager node and binds to it.

When a Flow Manager node fails, mobility management can also fail for many ongoing QoS flows. To minimize the impact, a new (backup) Flow Manager node is identified immediately and the mobility management functionality resumed with the new Flow Manager assuming the role of the failed Flow Manager. The backup Flow Manager substitutes for the failed Flow Manager either when it is directly requested by the current (failing) Flow Manager or when no broadcast announcement of its presence is received by the source node for some time, indicating that Flow Manager is no longer present. As an additional check, the backup Flow Manager would also attempt to exchange packets with the (failing) Flow Manager to ensure that is has malfunctioned. The procedure for handling Flow Manager node failure is as follows:

The source nodes are all informed of any backup Flow Manager nodes, since when a node associates itself with a Flow Manager it typically also associates itself with a backup Flow Manager. (Also, optionally, the source node can acquire a directory of backup Flow Managers from its current Flow Manager.)

When the current Flow Manager node fails, the source node accesses its directory of backup Flow Manager nodes and selects an alternate Flow Manager node.

If the source node has no known backup Flow Manager node, it executes a ring-search to find a nearby Flow Manager, and binds to the most appropriate Flow Manager node identified.

Additionally, neighboring nodes with up-to-date Flow Manager node information can assist the source node by responding to the ring-search.

A source node 401 wishing to establish a RRTP QoS flow first binds itself to a local Flow Manager, 430. This binding relationship is maintained until these two nodes lose connectivity (e.g., move away from each other, or encounter node failure, or terminate data transport). The Flow Manager 430 with which the source node 401 binds serves as the home Flow Manager for the source node 401. Once the home Flow Manager 430 is identified and binding of the nodes accomplished, the home Flow Manager 430 creates per-destination multipath trees rooted at itself and extending to the destination node 409 based on the present known positions of the nodes and their projected mobilities, via any required intermediate subnets, e.g. 4C and 4D. The home Flow Manager 430 is also responsible for signaling foreign Flow Managers (i.e., Flow Manager nodes in other subnets) e.g. 450, 470, on the multipath tree to create active and virtual reservations. The foreign Flow Manager nodes, e.g. 450, 470, upon receiving the signaling messages from the home Flow Manager node 430 interact with their respective Subnet Manager nodes to grant, deny, or negotiate reservations for supporting the requested QoS.

RRTP has three QoS service modes: Guaranteed Rate (GR), Available Rate (AR), and Variable Rate (VR). The Guaranteed Rate service mode specifies a reserved rate and is intended for those cases where bandwidth must be reserved for service by the network, even when not used. If the network lacks resources to support the guaranteed service, the network may preempt flows of other service classes in order to sustain the integrity of the guaranteed rate service. The preemption is based strictly on priority levels and service modes. For example, Guaranteed Rate service can preempt resources of Available Rate service of the same priority level. Since, reservations of Guaranteed Rate service are maintained even when the service is not used, an explicit message is required to remove such reservations.

Figure 5:
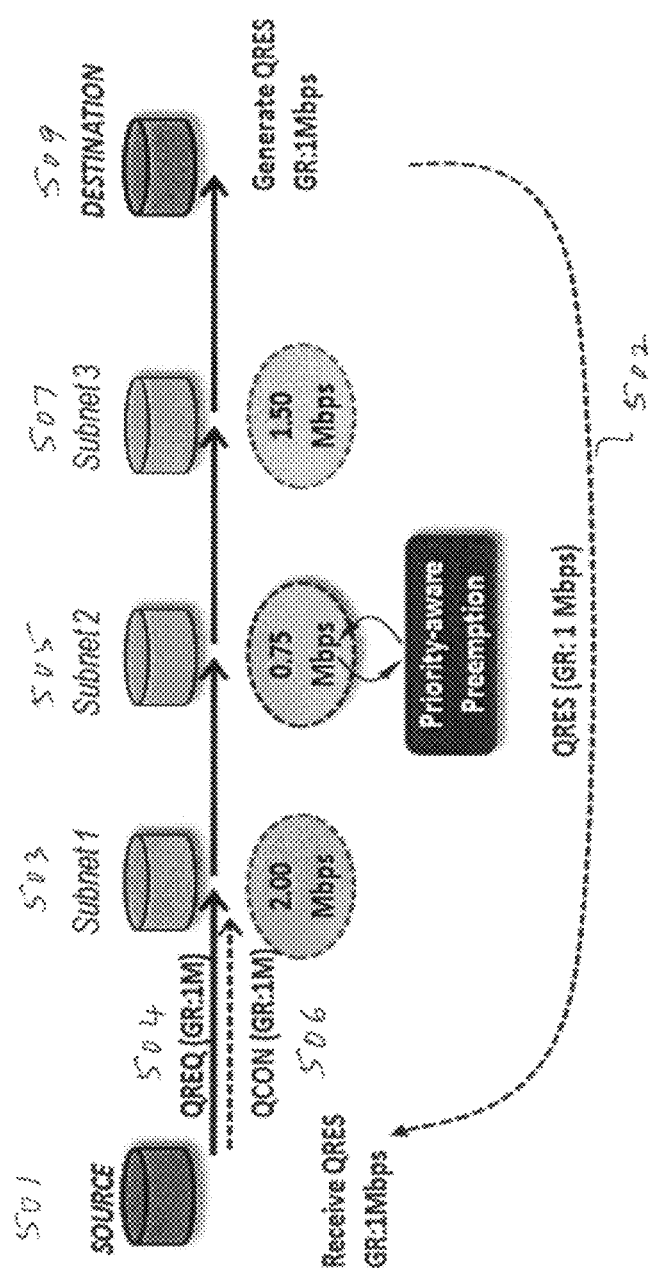
FIG. 5 is an illustration of the RRTP Guaranteed Rate Service.

FIG. 5 illustrates an example where the source node 501 requests a Guaranteed Rate service of 1 Mbps to destination node 509, accomplished via nodes in intermediate subnets 503, 505, 507. Here, one of the intermediate subnets, 505, lack the required resources and can only support a service of 0.75 Mbps. For supporting a Guaranteed Rate service of 1 Mbps, the node 505, thus, must preempt the resources allocated to lower priority requests or other service classes. For example, the GR service would preempt resource assignments to AR services, where the lowest priority AR service would be impacted first. If there are no AR service resources reservations to preempt, the GR service would preempt the AR service portion of the VR service.

The Guaranteed Rate service is appropriate for high priority flows requiring minimal packet loss and minimal end-to-end delay. The network takes every measure possible to accommodate the Guaranteed Rate service. With sufficient resources reserved along the path to the destination node, the destination node transmits a QoS Response message (QRES) 502 to the source node confirming the availability of resources for the requested Guaranteed Rate service. The source node, in turn, acknowledges receipt of the QRES message via a QoS Confirmation message (QCON) 506 that it transmits to the destination node, which upon receipt at the destination node establishes the end-to-end GR service.

For Available Rate service, the network determines the rate available for the flow, based on the network's current loading condition. This service mode does not require an explicit confirmation message. However, it is equipped with QoS-feedback mechanisms 602 that indicate the current resource availability or the data rate available en route to the destination. Implementing QoS-feedback as a QoS Response message (QRES) 602 not only benefits User Datagram Protocol (UDP) flows of variable data rates but also substantially benefits Transmission Control Protocol (TCP) data transfers, especially in a dynamic networking environment in which the network is characterized by wireless links and mobile nodes.

TCP generally performs poorly in a wireless mobile networking environment. Its data rate is severely lower than that expected from the resource availability because TCP relies on the end-to-end delay measurements and packet losses to regulate the data transport rate. Because of this shortcoming, TCP is often avoided in mobile ad hoc networks and UDP is used instead. The reason for not using TCP in MANET is that TCP performs poorly due to its congestion control algorithms, which combine various aspects of an additive-increase-multiplicative-decrease (AIMD) scheme with other schemes, such as slow-start, in order to achieve congestion avoidance.

The AIMD scheme combines linear growth of the congestion window with an exponential reduction in the data transport rate when a congestion takes place. The approach taken linearly increases the transmission rate (i.e. window size) until a packet loss occurs. This policy of additive increase increases the window size by 1 MSS (Maximum Segment Size) every RTT (Round Trip Time) until a packet loss is detected. When such loss is detected, the policy is changed to one of multiplicative decrease, which reduces the window size in half. The AIMD approach with slow-start works well for wired and static networks because the packet losses are rare in the wired network.

However, in MANET, packet losses are quite frequent. With each packet loss, TCP decreases its data transport rate by half. When this happens, it requires many successive and successful reception of packets to recover its prior transmission rate. Consequently, in networking environments characterized by frequent packet losses, TCP flows often remain at very low rates. To avoid this problem, MANET uses UDP as the primary transport protocol.

With RRTP, QoS-feedback in the Available Rate service allows the TCP flows to set the data transmission rate based on the network available rate. (FIG. 6) The source (sender) node 601 is informed of the available network data rate through the QRES message 602, and the source node adjusts its TCP rate to the network-supported rate. When the network capacity changes, the source node 601 is informed of the new available data rate or the new resource availability by a message from the destination node 609. This allows the sender to adjust its TCP rate and continue to transmit at the newly agreed data rate. Lost packets are simply retransmitted without slowing down. This allows TCP to achieve higher data rates in mobile ad hoc networks.

Figure 6:
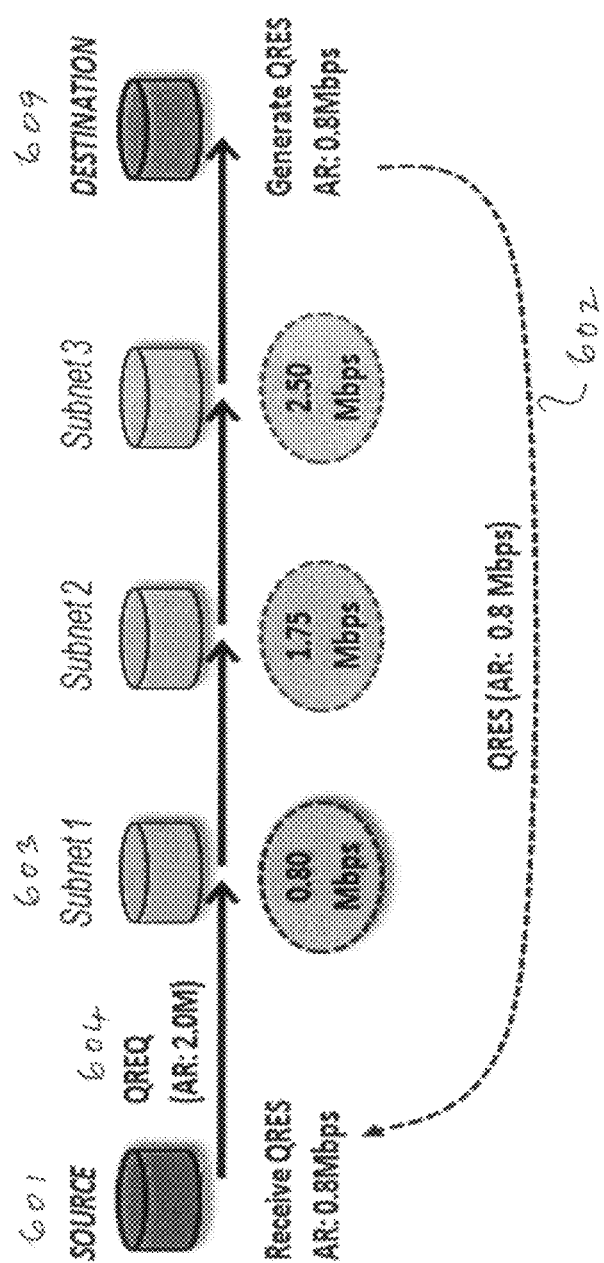
FIG. 6 is an illustration of the RRTP Available Rate Service.

FIG. 6 presents a schematic sketch of the Available Rate service mode, where the source 601 requests a maximum data transport rate of 2 Mbps, QREQ 604, with no minimum rate requirement for a high priority TCP flow. However, the flow path can only support 0.8 Mbps service, being limited by the intermediate subnet 603 that can only support a 0.8 Mbps data transport rate. This information is fed back by the destination node 609 to the source node 601 as a rate feedback message QRES 602. This rate feedback message 602 indicates the data rate available on the forward path (i.e., 0.8 Mbps) and reserves the bandwidth required for the reverse path ACK packets and QRES messages from the destination node. The TCP data rate is fixed by the source node 601 at 0.8 Mbps, and any lost packet is re-transmitted without any slow-starts. The resource availability of the network is continuously monitored by the destination node and the source node kept informed via the QoS-feedback mechanism. RRTP scales its Available Rate service data rate up or down consistent with the up-to-date resource availability.

The Variable Rate (VR) service is similar to the Asynchronous Transfer Mode Variable Bit Rate ATM VBR process. Some applications require a variable rate flow approach, where part of the rate is guaranteed and part is determined by the network's available rate. This is typically the case, when streaming media cannot function below a base rate but can take advantage of additional capacity if it is available. The available rate may change from time to time as the network capacity changes, whereas the minimum rate is guaranteed for the duration of the flow. In other words, a source node, e.g. 701 in FIG. 7, indicates its maximum and minimum rate requirement along with other QoS requirements (i.e., jitter, delay, etc.) in its reservation request (i.e., call setup), QREQ 704, but the network may commit resources less than those required for the requested maximum rate, based on the current resource availability. If the network is unable to meet the minimum QREQ 704 requirements (e.g., minimum rate), the reservation request is rejected and the source (sender) node 701 is informed by the destination node about the current lack of resource availability.

In this case, the source node 701 may try to reestablish the connection later or try to establish one via a different service class (e.g., request AR service instead of VR service, as that decision is entirely up to the sender's application). Otherwise, the source node 701 is provided the maximum available data rate exceeding or meeting the requested minimum QoS requirements. The network takes every measure to satisfy the source node's minimum QoS requirements and supply the required resources, if available. Once a RRTP flow has been established, the negotiated, end-to-end QoS is maintained by the Subnet Managers along the active path. The Subnet Managers enforce strict priority-based and service-based admission control so that additional RRTP flow requests are accepted only when the QoS requirements of the established/accepted RRTP flows of the same and higher priorities are not violated. Any enhanced variable rate is continuously renegotiated in accordance with any increased network resource availability.

Figure 7:
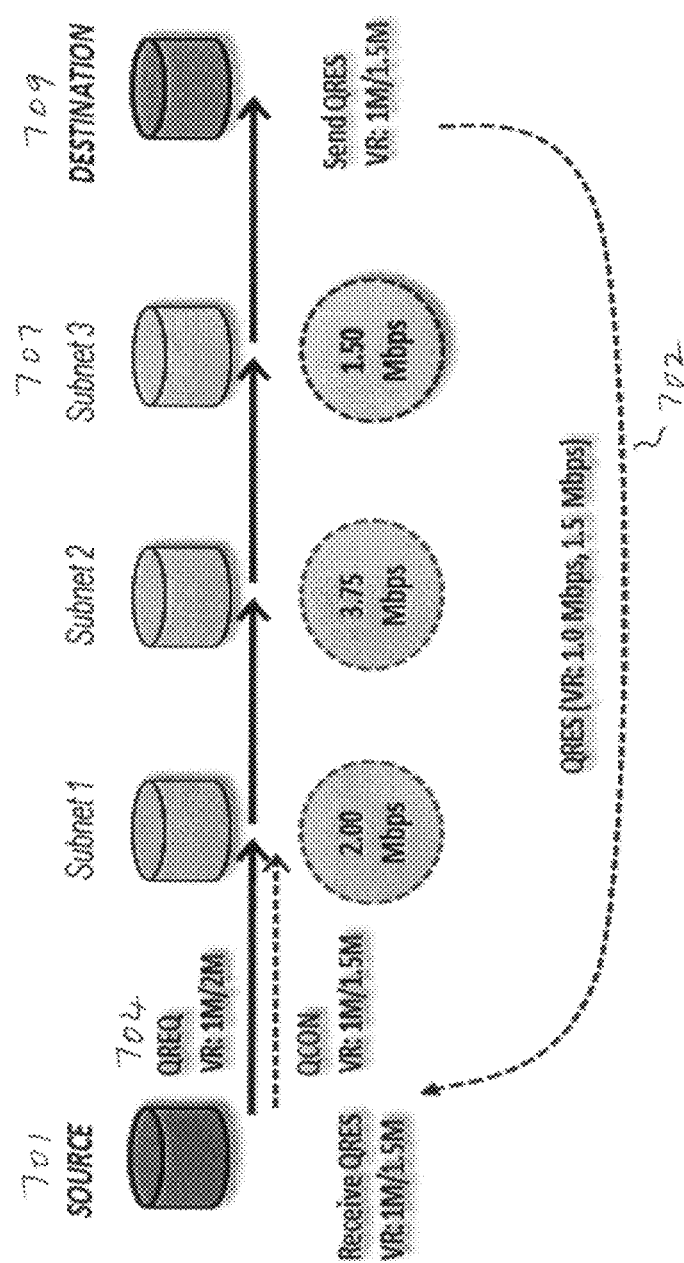
FIG. 7 is an illustration of the RRTP Variable Rate Service.

FIG. 7 illustrates a Variable Rate service example wherein the source requests a minimum data rate of 1 Mbps and a maximum of 2 Mbps. At each subnet, the request goes through the admission control process whereby the Subnet Manager assesses whether the requested data rates can be supported. If sufficient resources are available, the respective Subnet Manager commits, i.e. reserves, the required resources. As shown in FIG. 7, while subnet 1 and subnet 2 can each support the 2 Mbps maximum data rate requirement, subnet 3 can only support a data rate of 1.5 Mbps, which limits the maximum data rate allowable along the current forward path to only 1.5 Mbps. This information is fed back by the destination node 709 to the source node 701 via the QoS Response message (QRES) 702, and the source node 701 then sets its maximum data transport rate requirement to 1.5 Mbps. The minimum requirement of 1 Mbps is guaranteed, and the additional resources to obtain higher data rates along the current forward path are committed based on the current resource availability.

The RRTP establishes, manages, and terminates QoS flows between source nodes, e.g. 701, and destination nodes, e.g. 709, and carries the QoS assured payload. A RRTP connection is uniquely identified by the endpoints and a flow definition, as described below. The endpoints are a pair: a source endpoint 701 and a destination endpoint 709. (Though each endpoint is a unique node in this figure, that need not always be the case. For instance, in the case of multicast flows, the destination endpoint is identified by a multicast address which maps to multiple destination nodes.) The source endpoint 701, consists of the source node's network address and port number. The destination endpoint similarly consists of the destination node's address and port number. Thus, the destination endpoint address can be either a single destination node address or a multicast group address for RRTP flows from one (source) node to many (destination) nodes. The flow definition consists of the number of segments in the flow (where each flow from a given subnet node to the next immediate successive subnet node comprises a segment) and the number of nodes forming such segments. The flow definition also includes QoS structures describing the QoS service mode, service requirements, and priority level.

The critical part of establishing the RRTP connection is the QoS structure transmitted at the start of the traffic flow. The first or starter packet of the traffic flow includes the requested QoS structure. Each of the intermediate Flow Manager nodes receiving the first packet examines whether it has the required flow states available for the requested flow. The Flow Manager node interacts with its coupled Subnet Manager node to determine if the requested QoS structure can be supported.

If the requested QoS structure can be supported, the Subnet Manager node creates temporary reservations and states, pending confirmation, and forwards the first QoS packet, without any changes to the requested QoS structure, to the next subnet along the path to the destination node. If the Subnet Manager is unable to satisfy the rate, delay, or other QoS requirements specified in the QoS structure, it modifies the QoS structure in accordance with the requirements it is able to support and forwards the thus modified QoS Request packet to the next subnet. The QoS structure message is preferably not encrypted even where the remaining data information is encrypted. In this way, the RRTP flows are processed quickly and efficiently in the network.

Upon receiving the unmodified or modified starter QoS Request (QREQ) packet, the destination node 609, becomes informed of the resource availability on the current forward path from the source node 601. Based on this information, the destination node provides its QoS Response (QRES) 602 to the source node's request for the desired service mode. As an example, for the Available Rate service (FIG. 6), the destination node 609 simply responds with the 0.8 Mbps data rate available on the forward path. Upon receiving the QRES message, the source node 601 starts its data transmission at the QRES 602 available data rate. If the source node 601 is using TCP, slow-start can be reset to proceed at the approved rate (i.e., at the feedback rate in the QRES packet 602).

For Guaranteed Rate (GR) service, FIG. 5, the destination node 509 transmits the QoS data rate available along the forward path to the source node, 501, via the QoS Response message 502, confirming whether the forward path QoS resource availability meets the requirements of the QREQ message. Based on the resource availability indicated in the QRES message 502, the source node 501 can choose to confirm the Guaranteed Rate service, confirm a reduced Guaranteed Rate service (where the resource availability is less than that required for the initially requested QoS data rate), or terminate its GR service request.

For all cases, RRTP generates an explicit signaling message for either confirming QoS flow establishment or terminating the QoS request. If the end-to-end (i.e. source node-to-destination node) QoS agreement on the available data rate is different from that of the original QoS request, QREQ, the QoS confirmation packet, QCON, removes any excess interim reservations made along the forward path. This three-way communication (QREQ, QRES, and QCON) between the source node and the destination node is required for Guaranteed Rate service 502 and Variable Rate service 702. For Available Rate service, however, no confirmation is necessary because the QoS-feedback message, QRES 602, mandates the available data transmission rate which the source node 601 accepts. Any violation of this mandated rate (e.g., transmitting at a data rate higher than the approved data rate) is detected by the QoS monitoring (also known as QoS policing) performed by the Subnet Managers.

If a given intermediate Subnet Manager node, such as for subnet 603, is unable to continue supporting the QoS to which it had previously agreed, it forwards a new modified QoS structure to the destination node 609, indicating its new resource-limited reduced data rate availability. The destination node 609 sends this new QoS resource-limited available data rate information, via the QRES message 602, to the source node 601, which then immediately adjusts to the new QoS available data rate. This ensures that the network promptly accommodates changes in resource availability, without involving QoS monitoring, thereby minimizing any downtime during data transfer.

By using the rate feedback mechanism between the end nodes, i.e. the source node and destination node, the Available Rate service supports data transport at the maximum allowable data rate, which fluctuates with changes in the availability of the network's resources. The destination node 609, for example, can generate new QoS Feedback/Responses at regular intervals, reflecting current resource availabilities, and support the source node 601, in efficiently exploiting the resources available along the forward path.

Figure 8:
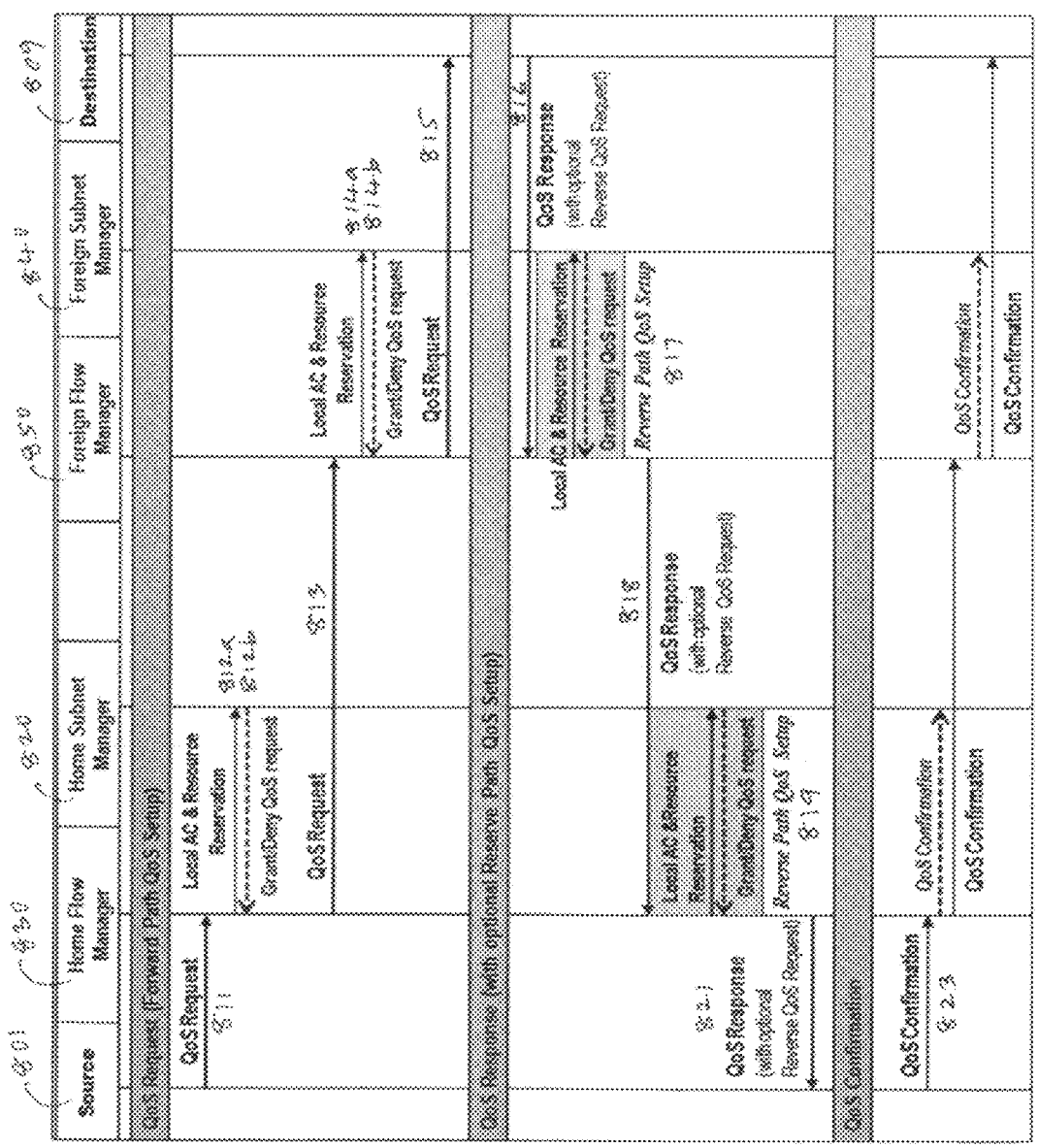
FIG. 8 is an illustration of the RRTP Connection Establishment process.

FIG. 8 presents the RRTP flow establishment process between the source node 801 and the destination node 809. The RRTP QoS flow establishment in FIG. 8 involves a home Flow Manager node 830, a home Subnet Manager node 820, one or more foreign Flow Manager nodes, e.g. 850, and one or more foreign Subnet Manager nodes, e.g. 840. FIG. 8 depicts the signaling interactions and related signaling messages exchanged between these entities for establishing a RRTP flow. The source node 801 initiates a RRTP flow, by sending a QoS Request message (QREQ) 811 to its home Flow Manager node 830. The QREQ describes the requested QoS structure, which includes, among others, the desired QoS service mode, data rate(s), delay bounds/priorities, and priority level. Upon receiving the QREQ message 811, the home Flow Manager 830 forwards the QREQ message to its coupled Subnet Manager 820 in step 812a. The Subnet Manager 820 performs local admission control in step 812, i.e. the Subnet Manager assesses whether the requested data rates can be supported, commits resources if available, to support the desired QoS, and creates the necessary flow states for maintaining such desired QoS. (The response message in step 812b typically presents one of three possibilities: 1) grant the QREQ requested QoS; 2) deny the QREQ requested QoS; or 3) suggest an alternative QoS consistent with the resources available to the Subnet Manager 820. If it has sufficient resource availability, the Subnet Manager 820 simply grants the QREQ requested QoS. If the required additional QoS support for the received QREQ 811 is unavailable, the Subnet Manager 820 denies the request. Otherwise, it responds with a suggested QoS structure.) The Subnet Manager maintains the flow state table, which provides detailed information on the accepted RRTP flows traversing the subnet. This information typically includes details with respect to the negotiated QoS (e.g., service mode, data rates, delay bound, priority) and the resources committed to support it.

Upon verifying that the local subnet can support the requested QoS service 812, the home Flow Manager 830 establishes a multipath tree rooted at itself and extending to the destination node based on its known location and projected node mobilities. In step 813, the home Flow Manager node 830 propagates the QREQ message 811 to the foreign Flow Managers, e.g. 850, residing on the multipath tree. In step 814, each such foreign Flow Manager, e.g. 850, performs its own local admission control, i.e. signals its local Subnet Manager, e.g. 840, with the QREQ message 811 in step 814a, and the Subnet Manager, e.g. 840, replies to the QREQ message of step 814a with a response message in step 814b. As discussed above for the home Subnet Manager, if the foreign Subnet Manager 840 has sufficient resource availability, it grants the QREQ requested QoS. If the required additional QoS support for the received QREQ 811 is unavailable, the foreign Subnet Manager 840 denies the request. Otherwise, it responds with a suggested QoS structure.

If the QREQ is granted, the last foreign Flow Manager 850 forwards the QREQ, modified if required by any lack of resource availability en route, to the destination node 809 in step 815. The destination node 809 then generates a QoS Response message (QRES) 816 which travels back to the source node 801 via a series of intermediate reverse path steps 817, 818, 819, and 821. If necessary, such as for establishing interactive two-way QoS flow, the RRTP could piggyback a QoS Request message from the node 809 on the QRES message 816 to implement a reverse path RRTP flow. When the source node 801 receives the QRES 816 transmitted by the destination node 809, the source node is made aware of the resource availabilities along both the forward and reverse paths which QREQ 811 and QRES 816 have traversed in their original or modified form depending on resource availability. (As with the forward path QRES message, local admission control is performed at the various subnets for the reverse path QoS Request accompanying the QRES message 816. All subsequent actions for reverse path data transport parallel those required along the forward path, with the forward path source node acting as a destination node for the reverse path RRTP flow and the forward path destination node acting as a source node.)

Upon receiving the QRES 816 in step 821, the source node 801 either confirms or terminates the RRTP flow establishment. Where the QoS service availability indicated in QRES 816 equals that requested by the source node 801 in QREQ 811, the RRTP flow is confirmed and established. This source node-to-destination node RRTP flow establishment is confirmed through the QoS Confirmation (QCON) message 823 propagated along the current forward path from the source node 801 to the destination node 809. Where the source node 801 determines that the QoS service availability indicated in QRES 816 does not meet the source node's minimum requested QoS service level requirement for supporting the desired RRTP QoS flow, the source node 801 can either terminate its QREQ 811 request and retry the flow establishment later along the same path, or send the QREQ 811 message down another path of the multipath tree. If, on the other hand, the source node 801 decides to accept a QRES 816 QoS service that falls short of the original QoS specification in QREQ 811, the source node 801 generates its acceptance in the QCON message 823 and forwards it to the destination node 809 along the chosen active path to confirm the resource reservations for supporting the QRES 816 indicated QoS service. Any excess resources reserved initially through QREQ 811 are released immediately as this QCON message 823 is propagated to the destination node 809.

Receipt of the QoS Confirmation (QCON) message 823 at the destination node 809 establishes the RRTP flow, and RRTP flow maintenance is started. The goal of RRTP flow maintenance is to sustain the source node-to-destination node RRTP connection without any loss in the QoS service agreed upon during the RRTP flow establishment phase. Besides maintaining the active resource reservations along the current path and the virtual reservations over the other paths of the multipath tree (rooted at the home Flow Manager, e.g. 830), this also involves policing for QoS violations along these paths. QoS violations, for example, can result from unexpected factors such as reduced resource availabilities related to topology changes or network failures so that the agreed upon data transport rate cannot be sustained.

Because the RRTP data packets and QoS feedback (QRES) messages can be used to refresh the reservation states, maintaining the reserved resources along the active path is a reasonably straightforward process. The reservations and their associated QoS flow states remain valid as long as they are refreshed periodically. In RRTP, all reservations are soft reservations associated with soft-state times. Soft reservations rely on the fact that a source sends data packets along an existing path. If a QoS data packet traverses a subnet that has no existing reservation, such as when the flow is re-routed (for example, due to node mobility) along an unexpected path, the data packet is treated as a QoS Request packet by the local Subnet Manager for committing resources to support the QoS assurances. If the Subnet Manger accepts the resource reservation request, it creates a soft-state to manage the newly reserved resource.

Subsequently received data packets associated with the resource reservations made by the Subnet Manager(s) are used to refresh the existing soft reservations. The receipt of each data packet at the node validates its (soft) resource reservation, which expires after a predetermined duration, unless refreshed periodically within such predetermined period. This duration or period is a system parameter called holding-time or soft-state time. The decision to accept or deny the request is called Admission Control (AC). Any reservations with expired soft-state times are automatically removed by the Subnet Manager. The sole exception arises in the Guaranteed Rate service case where the reservation is associated with either a permanent or an acceptably long duration soft-state time. For Guaranteed Rate service, the resources typically remain reserved for the entire session, regardless of actual resource usage.

The RRTP needs to carefully choose the soft-state time for providing effective soft-state management. Where the soft-state time is set for too short a period, premature release of reservations results. Where, on the other hand, the soft-state time is set for too long a period, underutilization of network resources results, as each node maintains reservations that may no longer be used or needed.

The Flow Manager 830, in collaboration with Subnet Managers on the data path, creates virtual reservations based on projected node mobilities. The home Flow Manager node 830, residing at the root of the multipath tree, periodically refreshes the virtual reservations through explicit signaling messages. When a reservation is refreshed, the soft-state timer resets, and the reservation remains valid until the soft-state time is allowed to expire.

Also, for QoS flows operating in the Guaranteed Rate, Variable Rate, and Available Rate service modes, the RRTP source node 801 continually receives updates from the destination node 809 via the QoS response message, QRES 816. The QoS response messages are typically periodic in nature, but additional ones are generated when noticeable events occur. For example, a RRTP QoS flow operating in the Variable Rate service maintains and verifies the integrity of its current QoS through periodic QRES messages from the destination node, e.g. 809. The QRES messages describe the QoS conditions on the forward path through multiple QoS metrics such as current data rate, path resource availability, path-delay, and packet-loss statistics. The QRES messaging mechanism between the source node-destination node pair (e.g. 801 and 809) also supports the RRTP in renegotiating the end-to-end (e.g. 801-to-809) QoS agreement based on any changed networking conditions encountered during the QoS data flow.

Figure 9:
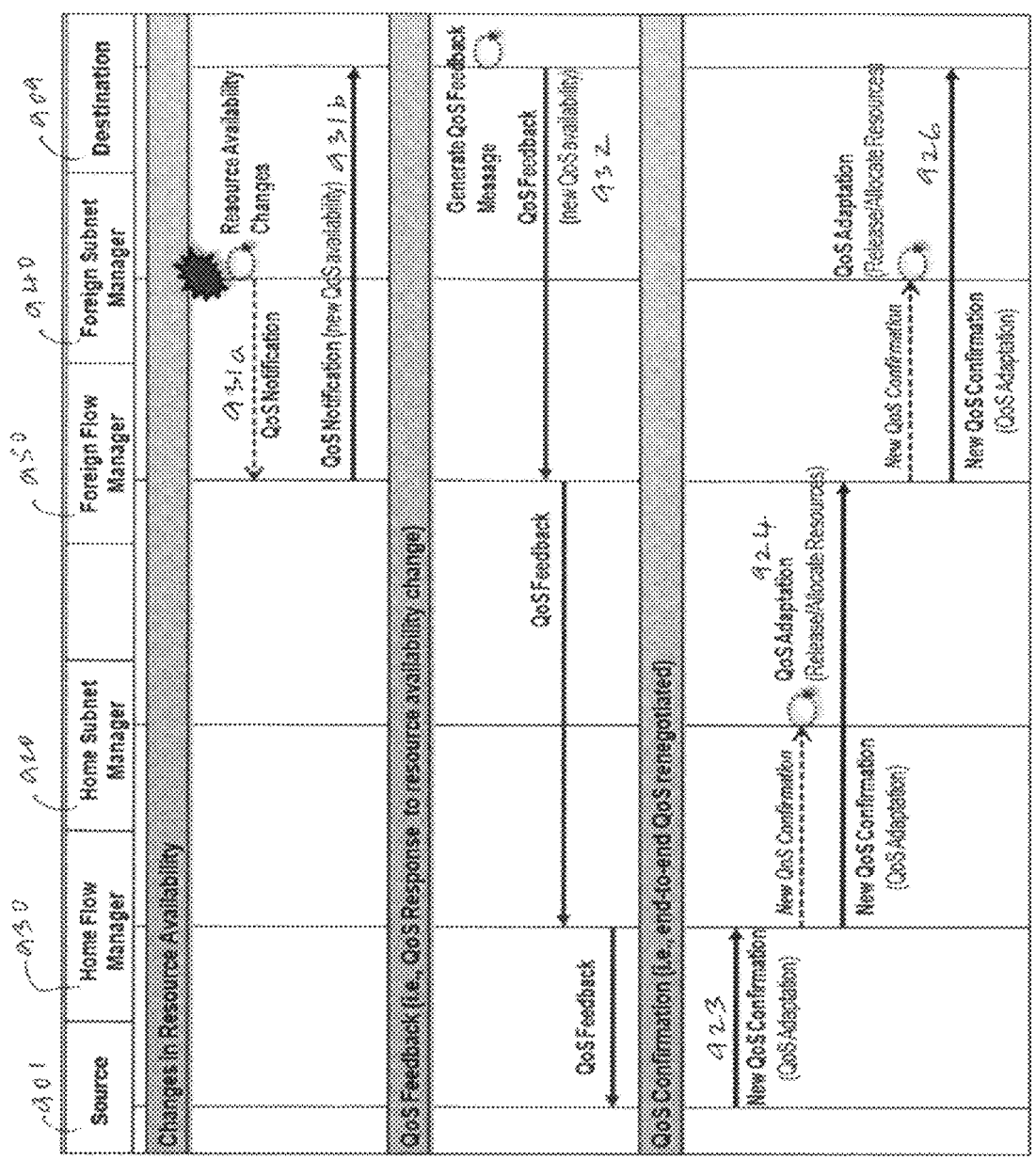
FIG. 9 is an illustration of the RRTP Connection Maintenance process.

RRTP is capable of adapting to the end-to-end, i.e. source node-to-destination node, resource availability while satisfying the various QoS requirements of ongoing RRTP flows operating in diverse service modes. Should changes in the resource availability impact current QoS levels of RRTP flows, this information is immediately notified to the endpoints, e.g. 901 and 909 (FIG. 9). In such cases, the Subnet Manager 940 generates a QoS Notification message 931*a*, which is forwarded in step 931*b* by its local Flow Manager 950 to the destination node 909. Upon receipt of the QoS Notification message, the destination node 909 immediately generates an event-based QoS feedback message 932 reflecting the changed resource availability on the forward path and transmits it to the source node 901 along the reverse path.

Upon receiving this QoS feedback message 932, the source node 901 becomes informed of the changed resource availability along the forward path and starts the QoS Flow Adaptation process 923. The RRTP QoS Flow Adaptation could be either a QoS Scale Down process or a QoS Scale Up process in order to decrease or increase the quality of service, respectively. The QoS Scale-Down Process is generally triggered by an event-based QoS feedback message 932, i.e. one that immediately notifies the source node of reduced resource availability along the forward path, while the QoS Scale-Up Process is triggered by a periodic QoS response message, i.e. one that notifies the source node of increased resource availability along the forward path. The RRTP Scale Down adaptation process, thus, closely tracks any changes in resource availabilities along the forward path from the source node to the destination node.

FIG. 9 illustrates the QoS Adaptation process, where in step 931 the Subnet Manager node 940 at the resource affected node notifies the destination node 909 of any changes in resource availability (e.g. lack of resources to support the current QoS agreement) via its locally coupled Flow Manager node, e.g. 950. The Flow Manager node 950 forwards the QoS Notification message received from the Subnet Manager node 940 to the destination node 909. Upon receiving the QoS Notification, the destination node 909 immediately generates a QoS feedback message 932 of the changed resource availability, and transmits it to the source node 901 via the intermediate Flow Managers, e.g. 950, 930. The source node 901 responds by scaling down its end-to-end reservations through the generation and issuance of a new QoS Confirmation message 923, which is propagated along the current RRTP flow path to the destination node 909.

The new QoS Confirmation message 923 refreshes only those reservations for which the required resources are still available, while removing reservations for the resources that have either become unavailable or are unused. For example, in steps 924 and 926, any excess reservations that are not refreshed are removed via the QoS Confirmation message 923, and any unused reservations are automatically released when their soft-state times expire.

Alternatively, once the source node. 901 receives the QoS feedback message 932 indicating that the resource availability on the current path is insufficient to meet the minimum QoS requirements, the source node 901 can choose to reestablish the RRTP flow along a different path (i.e. re-route the QoS data flow along another path of the multipath tree) or simply terminate the current RRTP QoS flow.

Figure 10:
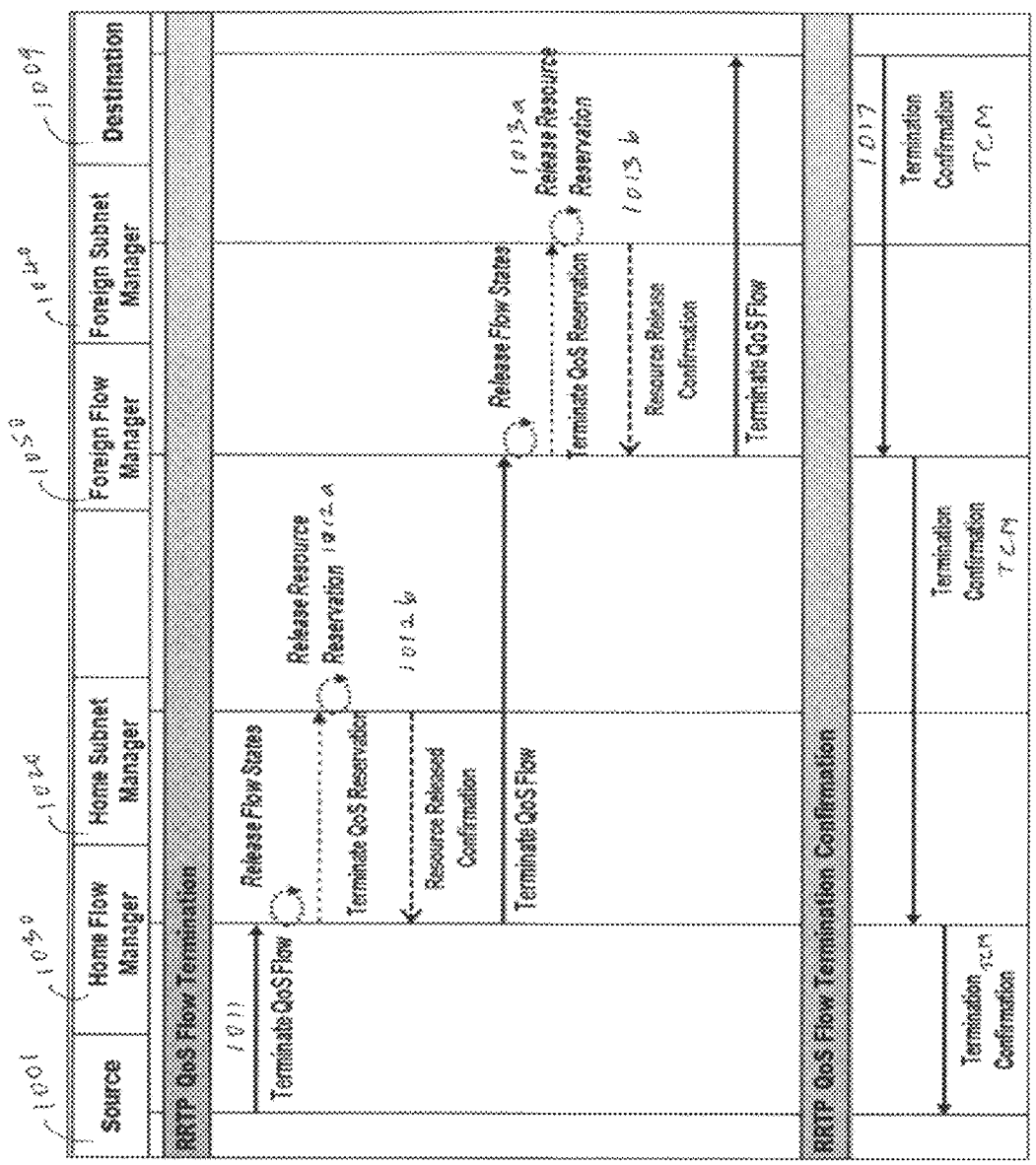
FIG. 10 is an illustration of the RRTP Connection Termination process.

FIG. 10 illustrates the RRTP QoS Flow Termination process, which typically occurs when the communication between the endpoints, e.g. 1001 and 1009, has completed, or, when a QoS flow reroutes, for example, due to changes in topology or resource availability. In the changed resource availability case, the reservations and soft-states along the old path are removed through the RRTP Flow Termination process. The RRTP can also terminate the QoS flow once the active path is unable to sustain the integrity of the QoS flow and the two endpoints, i.e. the source node and the destination node, agree to terminate the flow. (Such terminations occur with the Guaranteed Rate service and the Variable Rate service.)

The RRTP terminates the QoS flow by generating an explicit RRTP termination signaling message 1011 that is propagated from the source node 1101 to the destination node 1009, via the intermediate nodes, e.g. 1030, 1050, along the current path. This message first releases the reservations at the home Subnet Manager 1020 and the soft-states at the home Flow Manager 1030 in steps 1012a and 1012b. In steps 1013a and 1013b, as the RRTP flow termination message 1011 travels along all of the flow paths of the multipath tree rooted at the home Flow Manager 1030, all of those reservations and flow states are released as well. Thus, it not only removes all the active reservations and soft-states along the active path, but also releases all the virtual reservations and virtual soft-states along the alternate paths of the multipath tree. Upon receiving the RRTP termination message 1011, the destination node 1009 generates an acknowledgement, namely, a Termination Confirmation message (TCM) 1017, confirming the termination of the RRTP QoS flows. The TCM is propagated to the source node 1001 via the reverse flow path, confirming that all the associated states and reservations have indeed been released.

Figure 11A:
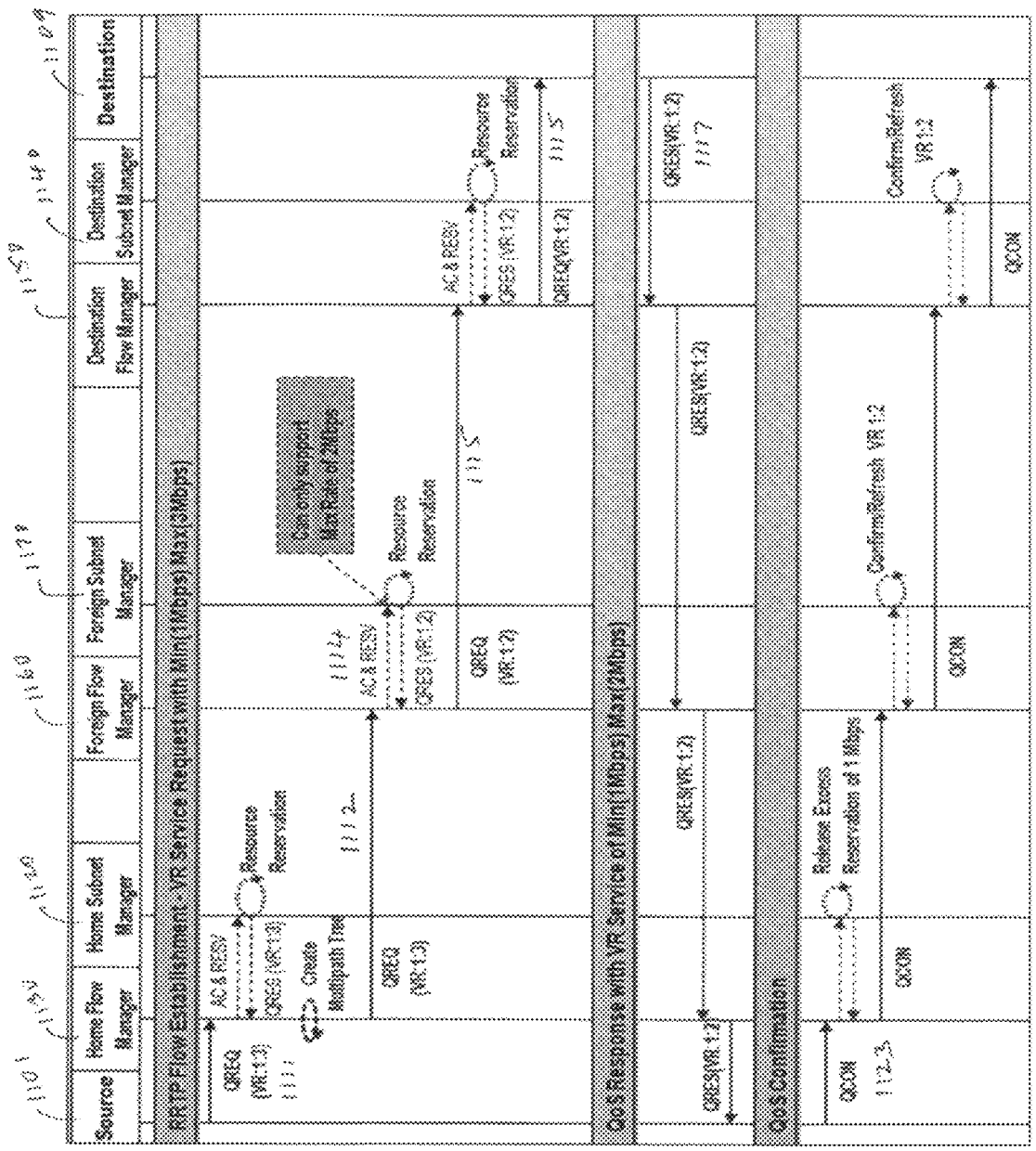
FIG. 11, presented as 11a, 11b, 11c is an illustration of RRTP connection establishment, maintenance and termination for a Variable Rate traffic flow.
Figure 11B:
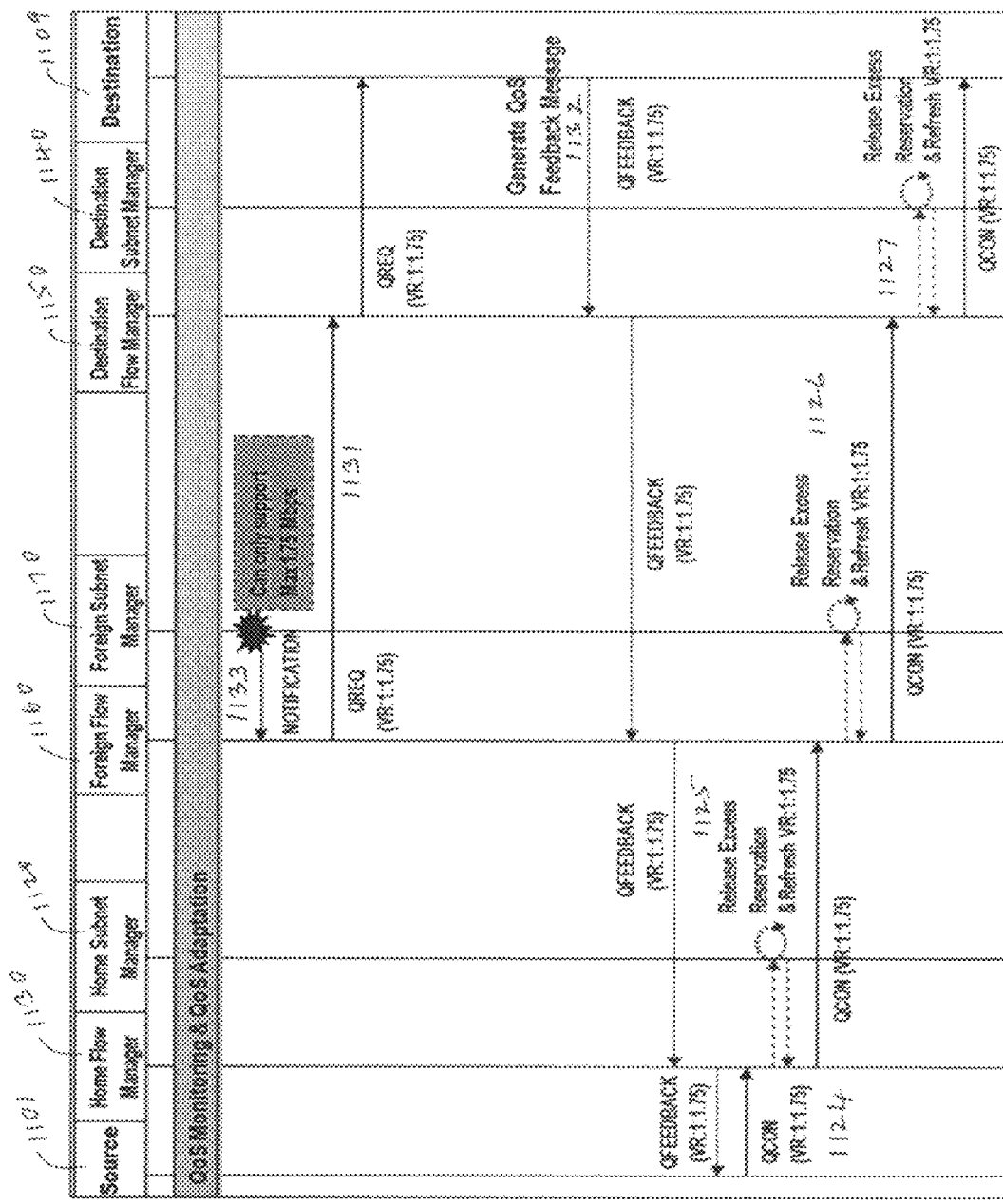
Figure 11E:
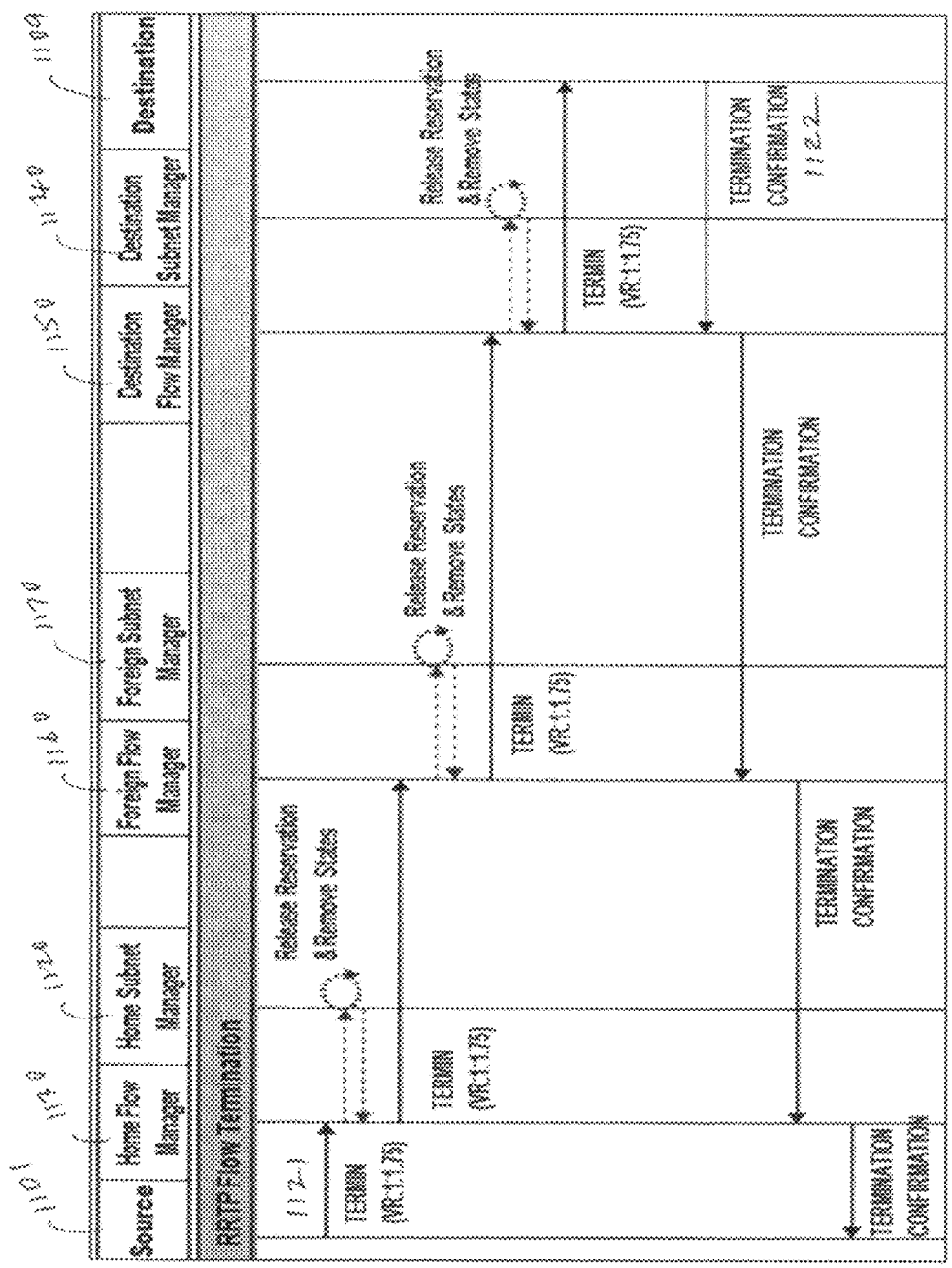

FIG. 11 illustrates the complete process of supporting a QoS assured traffic flow with RRTP for a Variable Rate flow process. The process steps detailed in FIGS. 11a, 11b, 11c are exemplary only, and none of the limitations shown are to be construed as limiting or in any manner defining the system or method of the present invention, which are only limited by the subject matter as claimed herein. When the source node 1101 initiates the RRTP flow establishment, it includes in its QoS Request (QREQ) 1111 appropriate QoS information and QoS requirements. In FIG. 11a, for example, the source node 1101 requests a Variable Rate Service of 1.0 Mbps minimum and 3.0 Mbps maximum. It encodes the QREQ 1111 with the requested service type, minimum and maximum data rates, delay bounds, priority level, and other relevant QoS parameters.

The QREQ 1111 initially passes its local Admission Control (AC) 1112 and resources are committed by the home Subnet Manager 1120 and home Flow Manager 1130 to support the requested QoS. The home Flow Manager 1130 forwards the QREQ 1111 to the destination node 1109 in conjunction with any intermediate foreign Flow Managers, e.g. 1160, and Subnet Managers, e.g. 1170, residing at different subnets between the source node 1101 and the destination node 1109.

Upon receiving the QREQ 1111 for the Variable Rate service RRTP flow, each foreign Flow Manager, e.g. 1160, performs its own local Admission Control. As an example, in step 1114 of FIG. 11, the foreign Flow Manager 1160 in conjunction with its local Subnet Manager 1170 determines that it lacks the resources required for supporting the maximum desired rate of 3.0 Mbps, and can only support 2.0 Mbps. This condition automatically modifies the original QREQ 1111 requirements to one compatible with a Variable Rate service data rate request of 1 Mbps minimum and 2 Mbps maximum, so that reservations are made accordingly at each such subnet node. All of the successive intermediate subnets make similar resource reservations and flow states as the modified QREQ(VR:1:2) 1115 is propagated towards the destination node 1109 with the possibility of additional modifications being made to the QREQ(VR:1:2) message 1115 depending on the resource availabilities at the successive foreign subnet nodes. When the destination node 1109 finally receives the modified QREQ(VR:1:2) 1115 request, it knows that the current path can support a Variable Rate Service of 1.0 Mbps minimum and 2.0 Mbps maximum. In other words, the RRTP flow will be serviced such that the minimum 1 Mbps data rate will be provided in the Guaranteed Service mode and the additional 1.0 Mbps data rate (contributing to the maximum 2 Mbps data rate) in the Available Service mode.

In response to the received QREQ(VR:1:2) message 1115, the destination node 1109 generates a QRES(VR:1:2) (i.e., QoS Response) message 1117 that describes the QoS that can be supported by the network. The QRES(VR:1:2) message 1117 travels the reverse path to the source node 1101. Upon receiving QRES(VR:1:2) 1117, the source node 1101 becomes informed of the resource availabilities and the committed tentative reservations made en route to the destination mode 1109.

The source node 1101 then generates an end-to-end (i.e. source node 1101 to destination node 1109) reservation confirmation message, namely QCON(VR:1:2) 1123. As the QCON(VR:1:2) 1123 message travels to the destination node 1109 along the RRTP data flow path, the tentative reservations and flow states made earlier along that path are confirmed as active reservations and active soft-states in preparation for active data transport. Any excess reservations made earlier in response to the initial QREQ 1111 message are released at the same time. The confirmed Variable Rate Service in FIG. 11a corresponds to a minimum data transport rate of 1.0 Mbps and maximum data transport rate of 2.0 Mbps. The RRTP QoS Flow Establishment is completed once the QCON(VR:1:2) 1123 message is received at the destination node 1109.

Once the RRTP QoS flow is established, the destination 1109 begins to periodically generate the QoS feedback message (QFEEDBACK) 1132, which captures the current status of the QoS and informs the source node 1101 accordingly. (FIG. 11b) This process requires each Subnet Manager in the relevant subnets, e.g. 1140, 1170, 1120, to monitor the QoS performance. When violations of the QoS agreement are detected or projected, or when there is a sudden resource shortage (for example, due to topology change or preemption of resources by higher priority RRTP flows), the affected Subnet Manager 1170 notifies its coupled Flow Manager 1160 via a notification message (QNOTIF) 1133, which is flowed as the QREQ (VR:1:1.75) message 1131 to the destination node 1109 via any intermediate nodes and/or Flow Managers, e.g. 1150.

Upon receipt of the QREQ (VR:1:1.75) message 1131 from the foreign Flow Manager node 1160, the destination node 1109 generates an event-based QoS feedback message (QFEEDBACK) 1132 that immediately informs the source node 1101 of the reduced resource availability (without waiting for the scheduled periodic generation of the QFEEDBACK message). The example QFEEDBACK 1132 in FIG. 11b shows that the network can no longer support the maximum data transport rate of 2 Mbps, and can only support 1.75 Mbps. The source node 1101 responds by generating a new QCON 1124 corresponding to min 1 Mbps and max 1.75 Mbps. As this new QCON 1124 travels the RRTP flow path to the destination node 1109, any excess reservations are released and the corresponding flow states updated accordingly 1125, 1126, 1127.

The RRTP flow termination process starts when the data transport process is completed, at which point the source node 1101 generates the flow termination message TERMIN (VR:1:1.75) message 1121. (FIG. 11c) As the TERMIN (VR:1:1.75) message travels to the destination node 1109 along the current RRTP flow path, it releases all of the current RRTP flow associated reservations and flow states. In parallel, the home Flow Manager node 1130 transmits explicit TERMIN (VR:1:1.75) 1121 signaling messages along the other paths of the multipath tree to release all of the remaining (virtual) reservations. When the TERMIN (VR:1:1.75) message 1121 is received at the destination node 1109, it confirms the termination by generating a TERMINATION CONFIRMATION message 1122, which is propagated back to the source node 1101. The process is completed and the RRTP flow is terminated once the TERMINATION CONFIRMATION message 1122 is received at the source node 1101.

Figure 13:
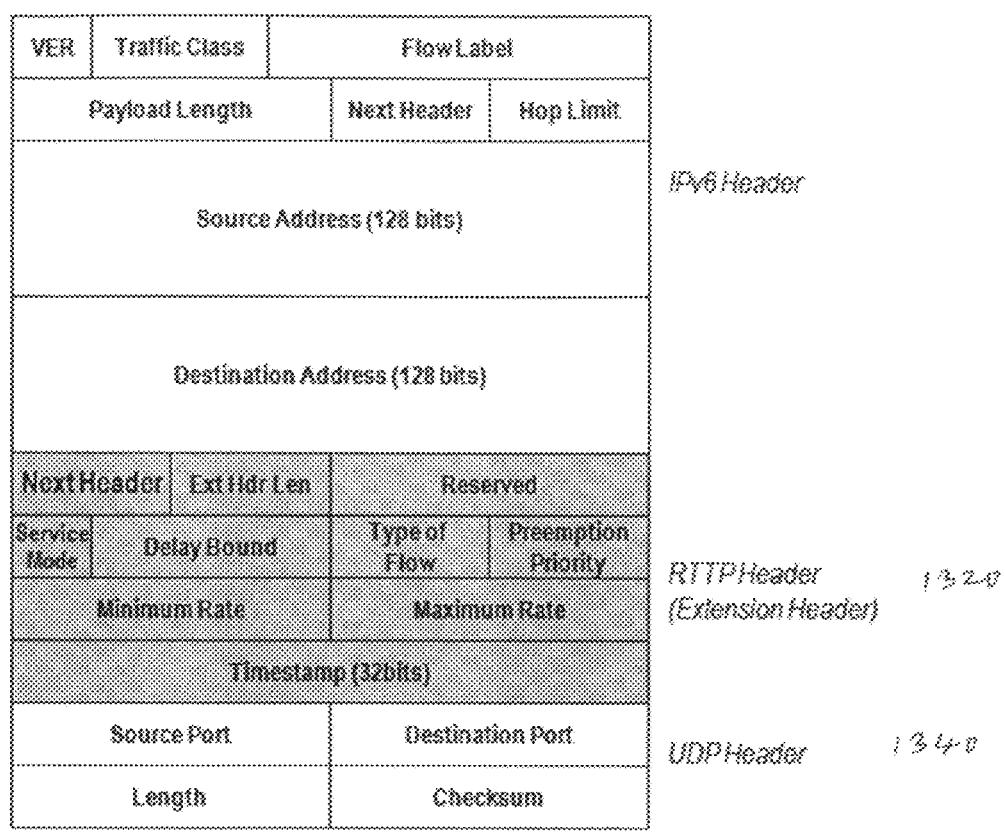
FIG. 13 shows an IPv6 datagram with RRTP header with UDP as its payload.
Figure 15:
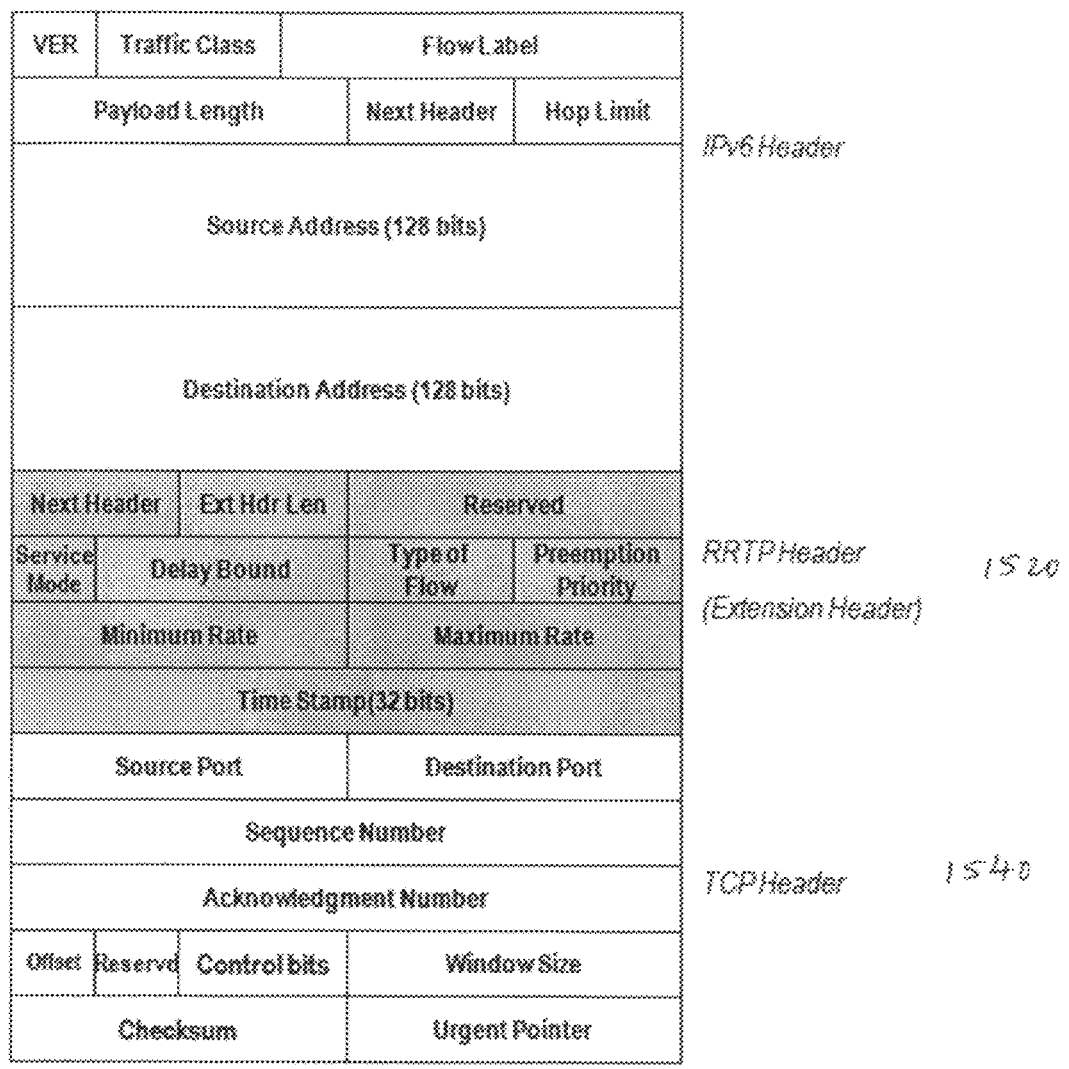
FIG. 15 shows an IPv6 datagram with RRTP header with TCP as its payload.

RRTP is designed to work with both Internet Protocol versions 4 and 6, IPv4 and IPv6, and it works with both TCP and UDP flows. RRTP header has all the information needed for QoS assurance and can be provided for both IPv4 and IPv6 with both UDP and TCP. The RRTP header is placed as IP option or Extension header between the IP header and transport protocol header. FIG. 12 depicts an IPv4 datagram with RRTP header 1220 with UDP 1240 as its payload whereas FIG. 14 shows an IPv4 datagram with RRTP header 1420 with TCP 1440 as its payload. With IPv6, RRTP header is placed as an extension header. FIG. 13 depicts an IPv6 packet with RRTP header 1320 with UDP 1340 as its payload, and FIG. 15 shows an IPv6 datagram with RRTP header 1520 with TCP 1540 as its payload.

In order to securely deliver sensitive or classified information over unprotected networks, RRTP resorts to Internet Protocol security (IPsec). Through IPsec, RRTP flows generated from the protected enclave are secured at the egress point (i.e., IPsec gateway) before they are transported over the unprotected side. IPsec essentially creates a boundary between unprotected and protected interfaces for a host or a network. IPsec functionalities facilitate network data encryption at the IP packet level, offering robust standard-based security for RRTP flows in the unprotected network. All of the RRTP QoS functionalities reside in the unprotected network, i.e. beyond the IPsec gateway.

RRTP conforms to the IPsec measures but requires placement of a RRTP header as IP option (for IPv4) or Extension header (for IPv6) in the IP header. RRTP can work with IPsec in either transport mode or tunnel mode, and each IPsec mode can implement either Authentication Header (AH) or Encapsulating Security Payload (ESP) protocol.

Figure 16:
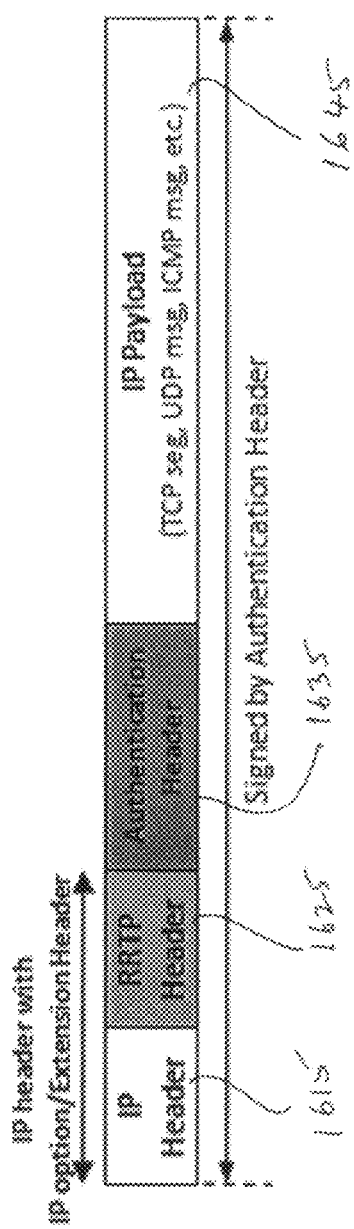
FIG. 16 depicts an IP datagram in IPsec AH transport mode with RRTP header as its IP option (IPv4) or Extension header (IPv6)
Figure 17:
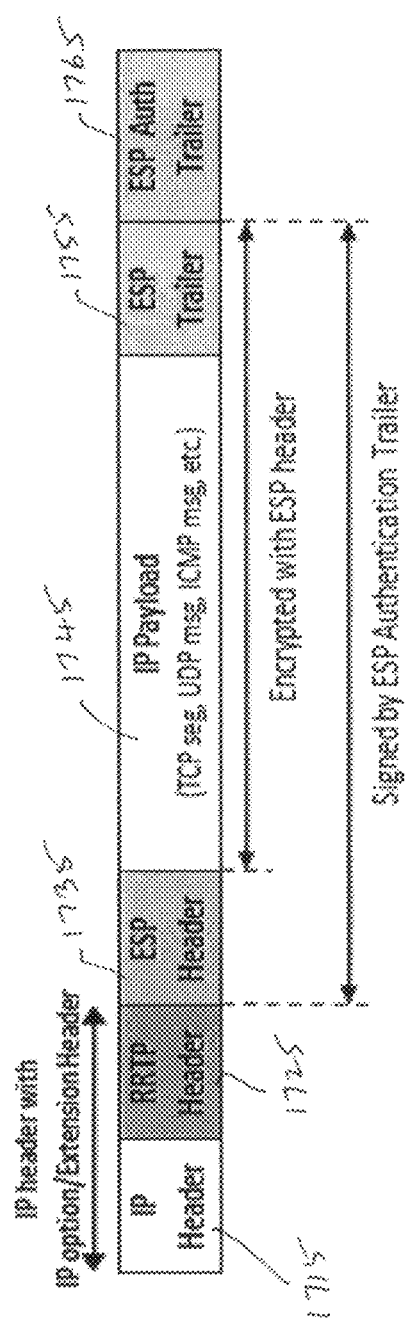
FIG. 17 illustrates an IP datagram in IPsec ESP transport mode with RRTP header as its IP option (IPv4) or Extension header (IPv6)

In the IPsec transport mode, only the IP payload is encrypted. The IP payload, protected by an AH or ESP header, is typically used for end-to-end communications between hosts. The original IP datagram that includes a RRTP header is re-assembled into an IPsec IP datagram, such as the one in FIG. 16 depicting an IP datagram in the IPsec AH transport mode with a RRTP header. FIG. 17, likewise, illustrates an IP datagram in the IPsec ESP transport mode.

With the AH transport mode, IPsec provides RRTP flows with authentication, integrity, and anti-replay protection for the entire packet but it does not provide confidentiality, which means that it does not encrypt the data. The data is readable but protected from modification. Integrity and authentication are provided by the placement of the AH header 1635 between the IP header 1615 and the IP payload 1645, as shown in FIG. 16. AH uses keyed hash algorithms to sign the packet for integrity but the RRTP header 1625 is treated as a zero-valued octet when computing or verifying the Integrity Check Value (ICV). The RRTP header is excluded from the ICV computation because it has mutable fields that would fail ICV verification and get discarded from the network.

Encapsulating Security Payload (ESP) provides confidentiality in addition to the aforesaid AH features (i.e., authentication, integrity, and anti-replay) for the IP payload. With the ESP transport mode, only the IP payload is protected. As shown in FIG. 17, the ESP header 1735 is placed before the IP payload 1745, while the ESP trailer 1755 and ESP authentication trailer 1765 are placed after the IP payload 1745. The signed portion of the packet indicates where the packet has been signed for integrity and authentication. The encryption portion of the packet indicates what information is protected with confidentiality. Since the IP header 1715 is not signed, it is not protected from modification. As shown in FIG. 17, RRTP header 1725 is placed after the base IP header 1715 as IP option or Extension header. This allows RRTP header 1725 fields to be changed during transit at intermediate routers without breaching IPsec integrity or authentication measures. For instance, a RRTP flow requesting VR service has a mutable "maximum rate" field in the RRTP header that could be modified at any intermediate node according to the local resource availability, but any changes in the mutable field do not violate any IPsec measures because the RRTP header resides in the IP header.

Figure 18:
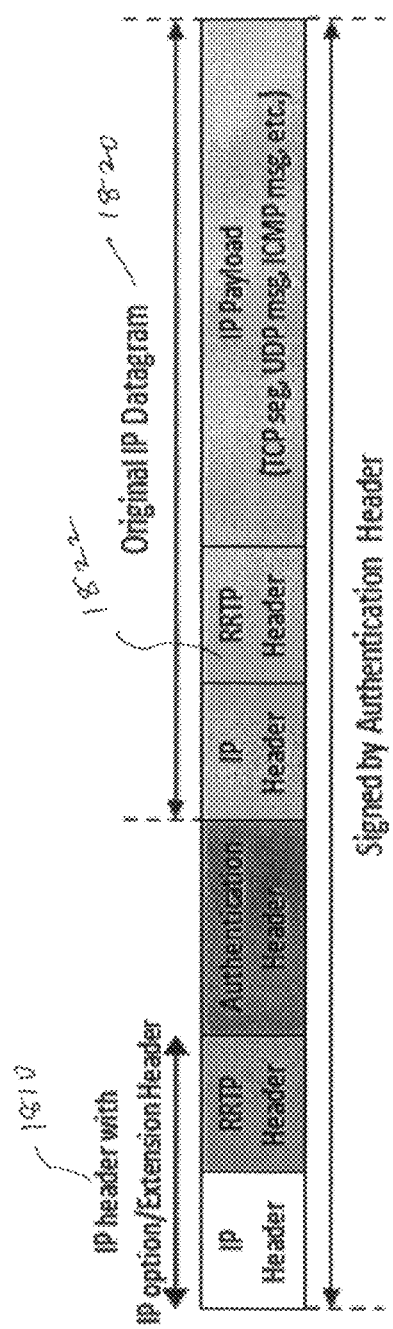
FIG. 18 depicts an IP datagram in IPsec AH tunnel mode with RRTP header as its IP option (IPv4) or Extension header (IPv6)
Figure 19:
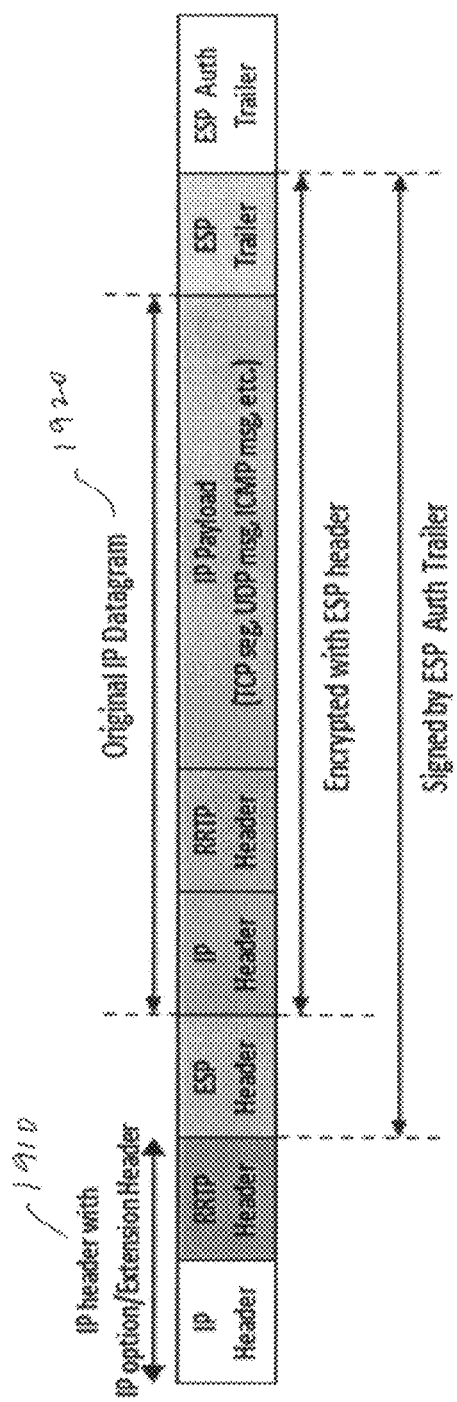
FIG. 19 illustrates an IP datagram in IPsec ESP tunnel mode with RRTP header as its IP option (IPv4) or Extension header (IPv6)

In contrast to the transport mode, IPsec tunnel mode is commonly used between gateways, or at an end-station to a gateway, the gateway acting as a proxy for the hosts behind it. (FIG. 18 and FIG. 19) With the tunnel mode, the entire original IP datagram 1820, including the RRTP header 1822, is encapsulated with the AH or ESP header and an additional outer IP header 1810. The encapsulated datagram has an outer IP header, which includes the RRTP header, followed by AH and ESP header as shown in FIG. 18 and FIG. 19, respectively.

Figure 20:
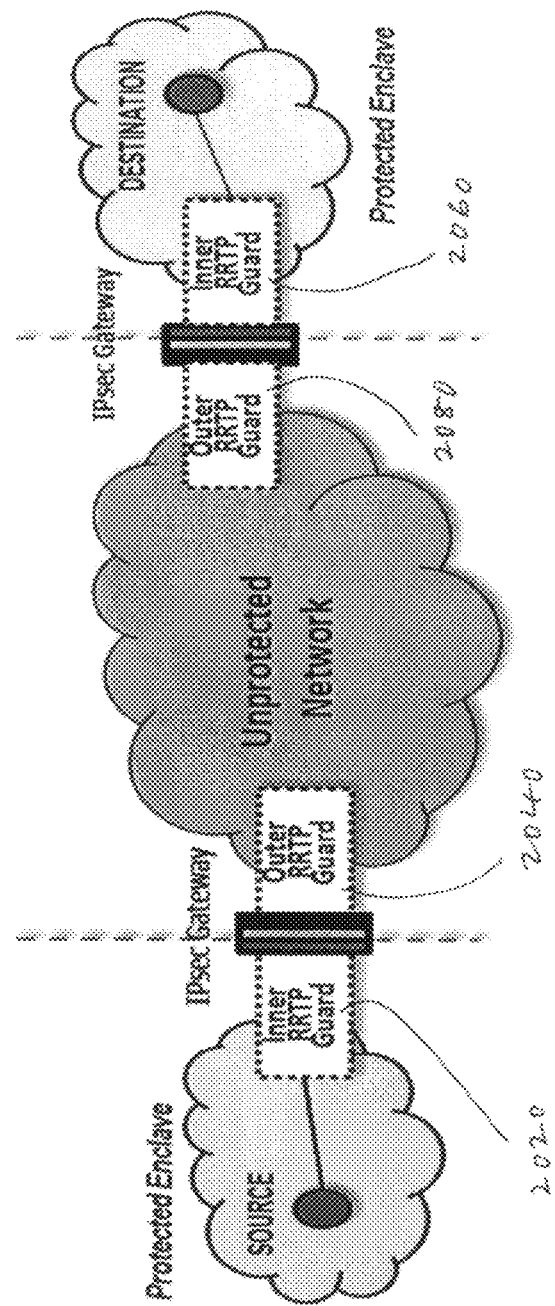
FIG. 20 is an illustration of cross guard approach that implements Inner RRTP Guard (IRG) and Outer RRTP Guard (ORG) for constructing outer RRTP header in IPsec tunnel mode.

The IPsec tunnel mode does not allow IP option or Extension header of the inner IP header (i.e. original IP datagram of the protected enclave, e.g. 1920) to be copied to the outer IP header, e.g. 1910. However, in order to facilitate full RRTP functionalities, the outer IP header 1910 is required to embed the RRTP header that describes the QoS specification. To transport the QoS specification through the IPsec gateway in a secure manner, RRTP implements cross domain RRTP guards, as shown in FIG. 20. The RRTP guard 2020, 2060 residing in the protected enclave is called an inner RRTP guard (IRG) while the RRTP guard 2040, 2080 residing outside the protected enclave is called an outer RRTP guard (ORG).

IRGs and ORGs can be implemented at the IPsec gateway or, as shown in FIG. 20, on separate hosts adjacent to the IPsec gateway (i.e., IRG before the IPsec gateway in the protected enclave and ORG after the IPsec gateway outside the protected enclave). The QoS specification described by the RRTP flow initiator in the protected enclave is encoded by IRG and transported securely to ORG in the unprotected enclave where the RRTP header is reconstructed as an IP option or Extension header as a part of the outer IP header. All RRTP components, except the IRG, reside outside the protected enclave. The host implementing the ORG can serve as the home Flow Manager for all RRTP flows originating in the protected enclave. In other words, an ORG fronting a protected enclave can be the home Flow Manager for the hosts within the protected enclave on the other side of the IPsec gateway.

Figure 21:
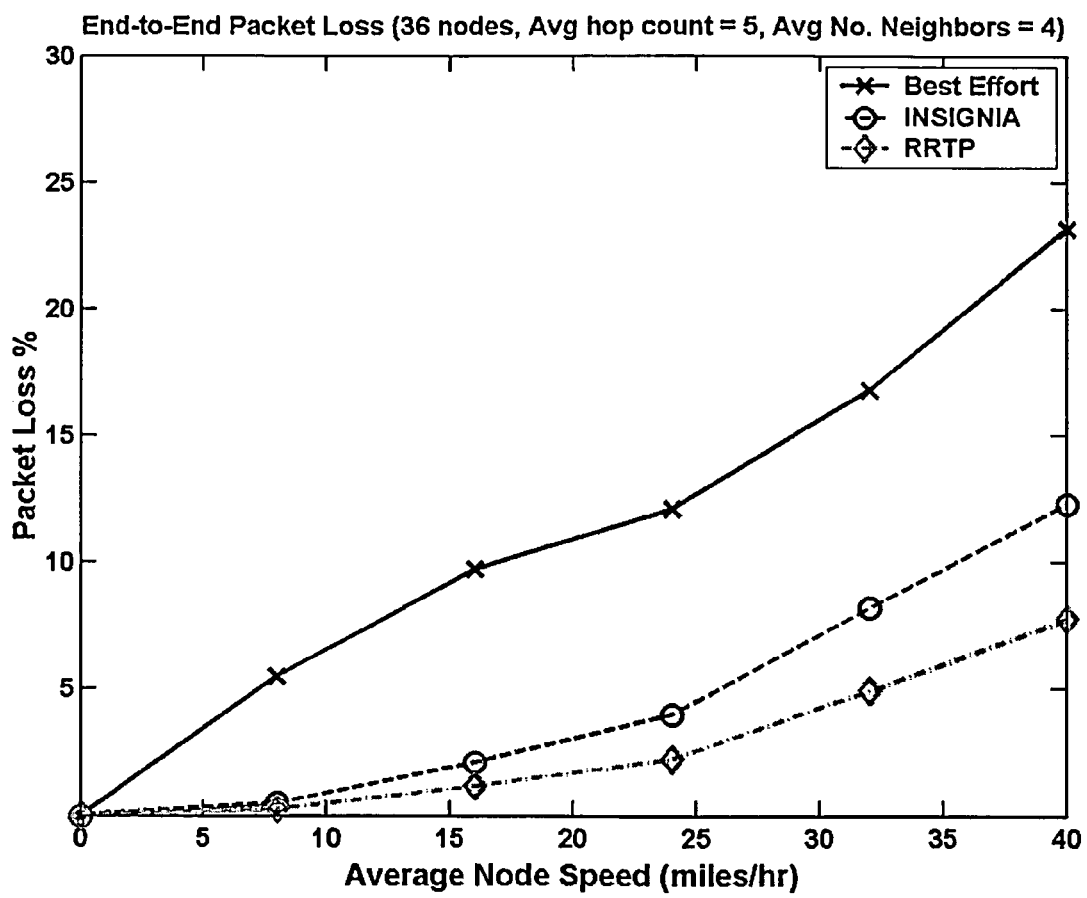
FIG. 21 is an illustration of the packet loss percentage performance of RRTP in a mobile wireless network.

FIG. 21 shows the end-to-end (i.e. source node-to-destination node) packet loss performance for a simulated 36-node network scenario, consisting of 18 nodes that are either stationary or moving in fixed orbits and 18 nodes that have random mobility at very high velocities. The average end-to-end hop count is five, and the connectivity, as indicated in the average number of nearest neighbors, is four. The network loading condition was varied randomly to emulate the real networking scenario. Both the RRTP traffic and INSIGNIA flows are able to utilize the reserved resources in the network and minimize packet drops, while the best effort flows, serviced with very limited resources, result in frequent packet drops. At the average node speed of 16 miles/hr, the best effort traffic suffers approximately 10% packet loss while the INSIGNIA traffic suffers approximately 2% packet loss. With the RRTP traffic the packet loss performance improves additionally to approximately 1.3%. The packet loss performance gap between RRTP and INSIGNIA widens even further as the network mobility increases, making RRTP the desirable protocol for dynamic scenarios. At the average node speed of 32 miles/hr, the INSIGNIA traffic manifests a packet loss of approximately 8% while the RRTP traffic experiences packet loss of 5%, a difference of 3%.

The performance improvement of RRTP over INSIGNIA derives from the RRTP's multipath tree and the resource reservations made along its multiple paths. Higher average node speeds correspond to more frequent topology changes and more frequent rerouting of active flows. Consequently, as the network mobility increases, the RRTP traffic flows and their rerouting benefit from the assured availability of the pre-existing reserved resources along the alternate paths of the multipath tree to which the traffic can be diverted immediately, thereby minimizing any routing gaps and avoiding packet drops during the rerouting events. In addition, the RRTP traffic flows also benefit from the virtual reservations on the multipath tree.

The words "including", "comprising", "having" and "with" as used herein are to be interpreted broadly and comprehensively. Moreover, any embodiments disclosed in the subject application must not be taken as the only possible embodiments. Other embodiments will occur to those skilled in the art and are within the scope of the claims herein.

We claim:

1. A data transport system for a wireless digital communication network comprising:
    at least two relay nodes, at least one Subnet Manager node, and at least one Flow Manager node, wherein said at least one Flow Manager node includes a home Flow Manager node connected to a first relay node serving as a source node;
    a second relay node serving as a destination node;
    a multipath tree rooted at the home Flow Manager node for data transport along one of at least two paths from said source node to the destination node;
    a Real-time Reservation Transport Protocol (RRTP) for Quality of Service data transport in Mobile Ad-Hoc Networks from the source node to the destination node, said RRTP using in-band signaling by said home Flow Manager for making actual reservations of node resources along an active data transport path of the multipath tree and virtual reservations that can be dynamically switched to active status along at least one alternate data transport path of said multipath tree for said Quality of Service data transport.

2. The data transport system of claim 1, wherein each relay node, each Subnet Manager node, and each Flow Manager node has the same network interface type.

3. The data transport system of claim 2, wherein each Subnet Manager node manages the networking resources of the nodes within its subnet.

4. The data transport system of claim 3, wherein each Subnet Manager node is coupled to a Flow Manager node.

5. The data transport system of claim 4, wherein each Flow Manager ensures that the data transport Quality of Service assurances are met.

6. The data transport system of claim 2, wherein the Real-time Reservation Transport Protocol further includes initiating data transport and monitoring its compliance with the Quality of Service requirements, dynamically updating said requirements, terminating the data transport, and releasing the reserved resources and flow states.

7. The data transport system of claim 6, wherein updating said requirements includes adapting the data transport to the updated Quality of Service requirements.

8. The data transport system of claim 2, wherein the Subnet Manager node and the Flow Manager node are the same node.

9. The data transport system of claim 1, wherein the Real-time Reservation Transport Protocol further includes creating flow states along the multipath tree.

10. The data transport system of claim 9, wherein the Real-time Reservation Transport Protocol further includes release of the reserved resources and flow states.

11. The data transport system of claim 1, wherein the Real-time Reservation Transport Protocol further includes data transport compliance with the Quality of Service requirements.

12. The data transport system of claim 11, wherein the Real-time Reservation Transport Protocol further includes update of said Quality of Service requirements.

13. The data transport system of claim 12, wherein the Real-time Reservation Transport Protocol further includes dynamic update of the Quality of Service requirements.

14. The data transport system of claim 1, wherein the Real-time Reservation Transport Protocol further includes termination of the data transport.

15. The data transport system of claim 1, wherein the Real-time Reservation Transport Protocol further includes Quality of Service data transport from said second relay node to said first relay node for two way communication.

16. The data transport system of claim 1, wherein the source node identifies and substitutes an alternate Flow Manager node when its home Flow Manager node fails.

17. The data transport system of claim 16, wherein identification of an alternate Flow Manager node includes searching for the alternate Flow manager node.

18. The data transport system of claim 16, wherein the alternate Flow Manager assumes the functions of the home Flow Manager including establishment and maintenance of the multipath tree and data flow.

19. The data transport system of claim 1, wherein the data transport Quality of Service includes Guaranteed Rate service.

20. The data transport system of claim 1, wherein the data transport Quality of Service includes Variable Rate service.

21. The data transport system of claim 1, wherein the data transport Quality of Service includes Available Rate service.

22. The data transport system of claim 1, wherein the Real-time Reservation Transport Protocol further includes data transport along a path of the multipath tree.

23. A data transport system for a wireless digital communication network comprising:
   a plurality of relay nodes, at least two Subnet Manager nodes, and at least two Flow Manager nodes, wherein said Flow Manager nodes include a home Flow Manager node connected to a first relay node serving as a source node;
   a plurality of data transport network interface types among said nodes;
   a second relay node serving as a destination node;
   a multipath tree rooted at the home Flow Manager node for data transport along one of at least two paths from said source node to the destination node;
   a Real-time Reservation Transport Protocol for Quality of Service data transport in Mobile Ad-Hoc Networks from the source node to the destination node, said RRTP using in-band signaling by said home Flow Manager for making actual reservations of node resources along an active data transport path of the multipath tree and virtual reservations that can be dynamically switched to active status along at least one alternate path of said multipath tree for said Quality of Service data transport.

24. The data transport system of claim 23, wherein the Real-time Reservation Transport Protocol includes initiating data transport and monitoring its compliance with the Quality of Service requirements, updating said requirements, terminating the data transport, and releasing the reserved resources and flow states.

25. The data transport system of claim 24, wherein updating said requirements includes adaptation of the data transport to said updated Quality of Service requirements.

26. The data transport system of claim 23, wherein the Real-time Reservation Transport Protocol further includes providing Quality of Service data transport from said second relay node to said first relay node for two way communication.

27. The data transport system of claim 23, wherein each subnet of the network has at least one Subnet Manager node and at least one Flow Manager node for each network interface type.

28. The data transport system of claim 27, wherein at least one node has a plurality of data transport network interface types.

29. The data transport system of claim 27, wherein each Subnet Manager node manages the networking resources of the nodes of its interface type within its subnet.

30. The data transport system of claim 29, wherein each Subnet Manager node is coupled to a Flow Manager node of the same interface type.

31. The data transport system of claim 30, wherein the Subnet Manager node and the Flow Manager node of the same interface type are the same node.

32. The data transport system of claim 30, wherein each Flow Manager ensures that the data transport Quality of Service assurances are met.

33. The data transport system of claim 23, wherein the Real-time Reservation Transport Protocol further includes termination of the data transport.

34. The data transport system of claim 23, wherein the data transport Quality of Service includes Guaranteed Rate service.

35. The data transport system of claim 23, wherein the data transport Quality of Service includes Variable Rate service.

36. The data transport system of claim 23, wherein the Real-time Reservation Transport Protocol further includes creating flow states along the multipath tree.

37. The data transport system of claim 36, wherein the Real-time Reservation Transport Protocol further includes data transport along a path of the multipath tree.

38. The data transport system of claim 36, wherein the Real-time Reservation Transport Protocol further includes release of the reserved resources and flow states.

39. The data transport system of claim 23, wherein the Real-time Reservation Transport Protocol further includes data transport compliance with the Quality of Service requirements.

40. The data transport system of claim 39, wherein the Real-time Reservation Transport Protocol further includes dynamic update of said Quality of Service requirements.

41. The data transport system of claim 39, wherein the Real-time Reservation Transport Protocol further includes update of said Quality of Service requirements.

42. The data transport system of claim 23, wherein the source node identifies and substitutes an alternate Flow Manager node when its home Flow Manager node fails.

43. The data transport system of claim 42, wherein the alternate Flow Manager assumes the functions of the home Flow Manager including establishment and maintenance of the multipath tree and data traffic flow.

44. The data transport system of claim 42, wherein identification of an alternate Flow Manager node includes searching for the alternate Flow manager node.

45. The data transport system of claim 23, wherein the data transport Quality of Service includes Available Rate service.

46. A method for providing Quality of Service data transport in a wireless digital communication Mobile Ad-Hoc network (MANET) comprising the steps of:
   establishing a multipath tree rooted at a Flow Manager node connected to a source node for data transport along one of at least two paths between said source node and a destination node;
   using in-band signaling for making actual reservations of node resources along an active data transport path of the multipath tree and making virtual reservations of node resources that can be dynamically switched from virtual to active reservation status along at least one alternate data transport path and creating flow states along the paths of the multipath tree;
   activating the path of the multipath tree having actual reservations for data transport;
   transporting data along said activated path;
   monitoring data transport compliance with the Quality of Service requirements; and
   terminating the data transport.

47. The method of claim 46, wherein monitoring data transport compliance with the Quality of Service requirements includes updating the Quality of Service requirements.

48. The method of claim 46, wherein activating a path of the multipath tree for active data transport includes activating an alternate path of the multipath tree having virtual reservations for active data transport.

49. The method of claim 48, wherein activating an alternate path of the multipath tree for active data transport further includes dynamically switching to said alternate path of the multipath tree.

50. The method of claim 48, wherein transporting data along the active path includes transporting data over said alternate path of the multipath tree.

51. The method of claim 46, wherein terminating the data transport includes releasing the reserved resources and flow states.

52. The method of claim 46, wherein data transport between nodes includes two way communication between the source node and the destination node.

53. The method of claim 46, wherein the resources for the data transport Quality of Service requirements include the networking resources of nodes managed by at least one Subnet Manager.

54. The method of claim 53, wherein the flow states for the data transport Quality of Service requirements include the flow states of at least one Flow Manager.

55. A wireless digital communication network comprising:
a plurality of network interface types among relay nodes, at least one Subnet Manager node, and at least one Flow Manager node, wherein said at
least one Flow Manager nodes include a home Flow Manager node connected to a first relay node serving as a source node;
a second relay node serving as a destination node;
a multipath tree rooted at the home Flow Manager node for data transport along one of at least two paths from the source node to the destination node;
a Real-time Reservation Transport Protocol for providing Quality of Service assurances to secure communication flows from the source node to the destination node through interoperation with security protocols in Mobile Ad-Hoc Networks (MANETs), said RRTP using in-band signaling by said home Flow Manager for making actual reservations of node resources along an active data transport path of the multipath tree and virtual reservations that can be dynamically switched to active status along at least one alternate data transport path of said multipath tree for said Quality of Service data transport.

* * * * *